US008811718B2

(12) United States Patent
Anai et al.

(10) Patent No.: US 8,811,718 B2
(45) Date of Patent: Aug. 19, 2014

(54) POSITION MEASUREMENT METHOD, POSITION MEASUREMENT DEVICE, AND PROGRAM

(75) Inventors: Tetsuji Anai, Tokyo (JP); Nobuo Kochi, Tokyo (JP); Nobuyuki Fukaya, Tokyo (JP)

(73) Assignee: Kabushiki Kaisha Topcon (JP)

( * ) Notice: Subject to any disclaimer, the term of this patent is extended or adjusted under 35 U.S.C. 154(b) by 882 days.

(21) Appl. No.: 12/980,839

(22) Filed: Dec. 29, 2010

(65) Prior Publication Data

US 2011/0096957 A1   Apr. 28, 2011

(30) Foreign Application Priority Data

Jul. 1, 2008   (JP) ................................. 2008-172665
Jul. 1, 2008   (JP) ................................. 2008-172737

(51) Int. Cl.
*G06K 9/00*      (2006.01)
*G01C 11/10*     (2006.01)
*G01C 11/06*     (2006.01)

(52) U.S. Cl.
CPC ............... *G01C 11/10* (2013.01); *G01C 11/06* (2013.01)
USPC ........................................ 382/154; 382/106

(58) Field of Classification Search
CPC ..... H04N 13/0239; G01C 11/10; G01C 11/06
USPC ................. 382/103, 154, 216, 291, 295, 106; 348/42, 47–50; 345/419–420
See application file for complete search history.

(56) References Cited

U.S. PATENT DOCUMENTS

| | | | |
|---|---|---|---|
| 7,552,025 B2* | 6/2009 | Ohtomo et al. ............... | 702/150 |
| 2005/0151839 A1* | 7/2005 | Ito et al. ........................ | 348/51 |
| 2007/0167154 A1 | 7/2007 | Ohtomo et al. | |
| 2007/0263924 A1* | 11/2007 | Kochi et al. ................... | 382/154 |
| 2008/0095402 A1 | 4/2008 | Kochi et al. | |
| 2008/0306708 A1* | 12/2008 | Germain et al. .............. | 702/153 |

FOREIGN PATENT DOCUMENTS

| | | |
|---|---|---|
| JP | 2005-338107 A | 12/2005 |
| JP | 2006-250917 A | 9/2006 |
| JP | 2007-147522 A | 6/2007 |
| JP | 2007-171048 A | 7/2007 |
| JP | 2007-322170 A | 12/2007 |
| JP | 2008-089314 A | 4/2008 |

OTHER PUBLICATIONS

International Search Report for International Application No. PCT/JP2009/062067, dated Aug. 11, 2009, 2 pages.
Yokochi, Yuji et al., "Estimation of Extrinsic Camera Parameters Based on Feature Tracking and GPS Data," Information Processing Society of Japan, vol. 47, No. SIG 5 (CVIM 13), Mar. 2006, pp. 69-79 (with English abstract).

* cited by examiner

*Primary Examiner* — Samir Ahmed
(74) *Attorney, Agent, or Firm* — Brinks Gilson & Lione

(57) ABSTRACT

A position measurement method includes an exterior orientation parameter correcting step S11 for correcting exterior orientation parameters calculated in a step S10, based on difference between photographing timing of an image and obtaining timing of a photographing position and/or a photographing posture measured outside, a bundle-adjusting step S12 for simultaneously adjusting a bundle of the exterior orientation parameters of one or more images and three-dimensional coordinates of characteristic points, based on the exterior orientation parameters corrected by the step S11, a three-dimensional coordinate calculating step S13 for calculating three-dimensional coordinates of characteristic points subsequently detected in an area in which the density of the characteristic points is decreased, based on the exterior orientation parameters adjusted bundle thereof, and a repeating step for repeating processing from the steps S10 to S13 until the image becomes a final image.

16 Claims, 21 Drawing Sheets

Distribution rate X=0

Distribution rate X=−

Distribution rate X=+

There is a partial distribution
of overlapping points : NG

There is no partial distribution
of overlapping points : OK

Fig. 21A
Fig. 21B
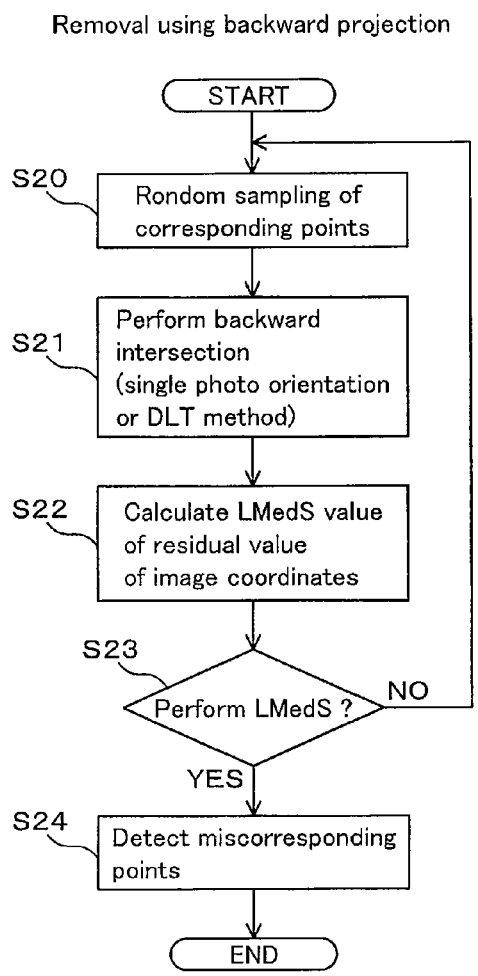
Removal using backward projection
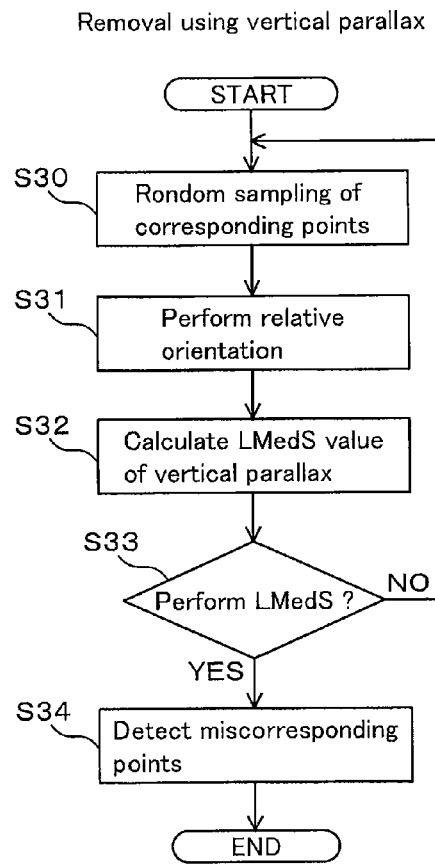
Removal using vertical parallax

POSITION MEASUREMENT METHOD, POSITION MEASUREMENT DEVICE, AND PROGRAM

RELATED APPLICATIONS

This application is a continuation of PCT/JP2009/062067 filed on Jul. 1, 2009, which claims priority to Japanese Application Nos. 2008-172665 filed on Jul. 1, 2008 and 2008-172737 filed on Jul. 1, 2008. The entire contents of these applications are incorporated herein by reference.

FIELD OF THE INVENTION

The present invention relates to a position measuring technique which measures photographing positions, photographing postures, and three-dimensional positions of objects based on moving images, and in particular, relates to a position measuring technique which reduces errors.

DESCRIPTION OF RELATED ART

The theory of photogrammetry has been researched for a long time. In recent years, a position measuring technique that measures photographing positions and photographing postures of a camera and three-dimensional positions of objects based on moving images, using the theory of photogrammetry, has been proposed (see Japanese Unexamined Patent Application Publication No. 2007-171048).

The invention described in Japanese Unexamined Patent Application Publication No. 2007-171048 is directed to a method in which position of a camera is measured by a backward intersection method and position of an object is measured by a forward intersection method, when positions cannot be measured by a GPS (Global Positioning System). According to this aspect, the position measurement is not interrupted.

However, the method in which the position of the camera and the position of the object are measured based on the images tends to generate errors. For example, a technique for overcoming this problem has been proposed in Journal of Information Processing Society of Japan Vol. 0, No. 13, Hirotsugu Yokoji, pages 1 to 11.

The invention described in Journal of Information Processing Society of Japan Vol. 0, No. 13, Hirotsugu Yokoji, pages 1 to 11 is directed to a method which simultaneously minimizes an error (reprojection error) between coordinates, in which an estimated three-dimensional position is projected on the image, and coordinates detected on the image, and a position error defined by GPS positioned values.

In addition, the invention described in Japanese Unexamined Patent Application Publication No. 2006-250917 is directed to a method in which camera vector (CV) data showing the position of the camera and three-dimensional rotational position of the object based on video images, and position measured data of a moving object, are synchronized in time by reference time and are compared on the same time axis, and they are complementarily corrected.

SUMMARY OF THE INVENTION

The present invention was completed in consideration of the above problems, and objects thereof are to provide a position measuring technique that measures photographing positions, photographing postures, and three-dimensional positions of objects based on moving images and which reduces errors.

The present invention according to claim 1 is characterized in that a position measurement method includes: an initial value calculating step for calculating initial values of exterior orientation parameters, which are a photographing position and a photographing posture, based on known points in an initial image or a photographing position and/or a photographing posture measured outside; an exterior orientation parameter-calculating step for calculating exterior orientation parameters, based on known points in a moving image which follows the initial image used in the initial value calculating step, or characteristic points in which three-dimensional coordinates are already calculated; an exterior orientation parameter correcting step for correcting the exterior orientation parameters calculated in the exterior orientation parameter-calculating step, based on a difference between photographing timing of the image and obtaining timing of the photographing position and/or the photographing posture measured outside; a bundle-adjusting step for simultaneously adjusting a bundle of the exterior orientation parameters of one or more images and the three-dimensional coordinates of the characteristic points, based on the exterior orientation parameters corrected in the exterior orientation parameter correcting step; a three-dimensional coordinate calculating step for calculating three-dimensional coordinates of characteristic points which are subsequently detected in an area in which the density of the characteristic points is decreased, based on the exterior orientation parameters adjusted bundle thereof; and a repeating step for repeating processing from the exterior orientation parameter-calculating step to the three-dimensional coordinate calculating step until the image becomes a final image.

According to the invention according to claim 1, the exterior orientation parameters are suitably corrected, even when the photographing timing of the image and the obtaining timing of the photographing position and/or the photographing posture measured outside are not synchronized, and therefore, the errors are decreased.

The present invention according to claim 2 is characterized in that in the invention according to claim 1, the exterior orientation parameter correcting step corrects the exterior orientation parameters, based on the difference between the photographing timing of the image and the obtaining timing of the photographing position and/or the photographing posture measured outside, and based on accuracy of the photographing position and/or the photographing posture measured outside.

According to the invention according to claim 2, the exterior orientation parameters calculated from the image are corrected in consideration of specific accuracy of the photographing position and/or the photographing posture measured outside.

The present invention according to claim 3 is characterized in that in the invention according to claim 2, the accuracy of the photographing position measured outside is positioning accuracy of each positioning mode of a RTK-GPS (Real Time Kinematic Global Positioning System), and threshold value for correcting the exterior orientation parameters is changed based on the positioning mode.

In the invention according to claim 3, the RTK-GPS changes the positioning mode in real time, based on position of a GPS satellite, multipath affected by surrounding conditions, correction information from a control station, and the like, which may affect the accuracy. Therefore, the exterior orientation parameters are suitably corrected by changing the threshold for correcting the exterior orientation parameters based on the positioning mode.

The present invention according to claim 4 is characterized in that in the invention according to claim 2, the accuracy of the photographing posture measured outside is accuracy based on measuring time of the photographing posture.

In the invention according to claim 4, the photographing posture measured outside tends to accumulate error by measuring time in a measurement principle. Therefore, the exterior orientation parameters are suitably corrected by considering the accuracy based on the measuring time of the photographing posture.

The present invention according to claim 5 is characterized in that in the invention according to claim 1, the bundle-adjusting step bundle-adjusts the photographing position and/or the photographing posture measured outside and the exterior orientation parameters and the three-dimensional coordinates of the characteristic points by calculating weights thereof and by weighting each data.

According to the invention according to claim 5, the photographing position and/or the photographing posture measured outside is simultaneously bundle-adjusted also in addition to the exterior orientation parameters and the three-dimensional coordinates of the characteristic points. In this case, data having low accuracy are lightly processed and data having high accuracy are heavily processed, since the data are weighted to bundle-adjust. As a result, the errors of the exterior orientation parameters and the three-dimensional coordinates of the characteristic points are decreased.

The present invention according to claim 6 is characterized in that in the invention according to claim 5, the weight of the photographing position and/or the photographing posture measured outside is calculated, based on the difference between the photographing timing of the image and the obtaining timing of the photographing position and/or the photographing posture measured outside.

According to the invention according to claim 6, the errors of the exterior orientation parameters and the three-dimensional coordinates of the characteristic points are decreased, even when the photographing timing of the image and the obtaining timing of the photographing position and/or the photographing posture measured outside are not synchronized.

The present invention according to claim 7 is characterized in that in the invention according to claim 5, the weights of the exterior orientation parameters and the three-dimensional coordinates of the characteristic points are calculated, based on residual between image coordinates of corresponding points calculated by tracking the characteristic points and image coordinates which project three-dimensional coordinates of the corresponding points on the image.

In the invention according to claim 7, the accuracy of the exterior orientation parameters and the three-dimensional coordinates of the characteristic points calculated from the images remarkably tends to depend on the tracking accuracy of the characteristic points. The residual according to claim 7 represents the tracking accuracy. Therefore, the errors of the exterior orientation parameters and the three-dimensional coordinates of the characteristic points are decreased by changing the residual to the weights of the exterior orientation parameters and the three-dimensional coordinates of the characteristic points.

The present invention according to claim 8 is characterized in that in the invention according to claim 5, the bundle-adjusting step is performed before calculation of the three-dimensional coordinates of the characteristic points subsequently detected or after calculation of the three-dimensional coordinates of the characteristic points subsequently detected.

According to the invention according to claim 8, when the bundle-adjusting step is performed before the calculation of the three-dimensional coordinates of the characteristic points subsequently detected, the calculation accuracy of the three-dimensional coordinates of the characteristic points subsequently detected is improved. On the other hand, when the bundle-adjusting step is performed after the calculation of the three-dimensional coordinates of the characteristic points subsequently detected, the three-dimensional coordinates of the characteristic points subsequently detected are calculated based on the corrected exterior orientation parameters, and as a result, a similar effect is obtained.

The present invention according to claim 9 is characterized in that the invention according to claim 1 further includes a miscorresponding point removing step for removing miscorresponding points, based on residual between the image coordinates of the corresponding points calculated by tracking the characteristic points and the image coordinates which project the three-dimensional coordinates of the corresponding points on the image.

According to the invention according to claim 9, the errors of the exterior orientation parameters and the characteristic points of the three-dimensional coordinates are reduced, since the miscorresponding points are removed even when the miscorresponding points are included in a tracked result of the characteristic points.

The present invention according to claim 10 is characterized in that the invention according to claim 1 further includes a miscorresponding point removing step for projecting three-dimensional coordinates of corresponding points in prior and subsequent images on a stereo image and for removing miscorresponding points based on difference of coordinate values in a direction intersecting a baseline direction of prior and subsequent stereo images at right angle.

According to the invention according to claim 10, the errors of the exterior orientation parameters and the characteristic points of the three-dimensional coordinates are reduced, since the miscorresponding points are removed even when the miscorresponding points are included in a tracked result of the characteristic points.

The present invention according to claim 11 is characterized in that in the invention according to claim 9 or 10, the miscorresponding point removing step is performed after the bundle-adjusting step or before the exterior orientation parameter-calculating step.

According to the invention according to claim 11, when the miscorresponding point removing step is performed after the bundle-adjusting step, the calculation accuracy of the exterior orientation parameters of subsequent images is improved. On the other hand, when the miscorresponding point removing step is performed before the exterior orientation parameter-calculating step, the errors of the exterior orientation parameters are decreased, since the exterior orientation parameters are not calculated based on the miscorresponding points.

The present invention according to claim 12 is characterized in that in the invention according to claim 9 or 10, the miscorresponding point removing step according to claim 9 or 10 is selected based on change in photographing conditions.

According to the invention according to claim 12, the exterior orientation parameters and the three-dimensional coordinates of the characteristic points can be calculated without depending on the change of the photographing conditions.

The present invention according to claim 13 is characterized in that in the invention according to claim 9 or 10, the miscorresponding point removing step estimates a threshold value by an LMedS estimation method.

According to the invention according to claim 13, compared to a least-squares method, the LMedS estimation method can robustly estimate outliers, even when the data includes numerous outliers. Therefore, the errors of the exterior orientation parameters and the three-dimensional coordinates of the characteristic points are decreased.

The present invention according to claim 14 is characterized in that a position measurement program runs the following steps includes: an initial value calculating step for calculating initial values of exterior orientation parameters, which are a photographing position and a photographing posture, based on known points in an initial image or a photographing position and/or a photographing posture measured outside; an exterior orientation parameter-calculating step for calculating exterior orientation parameters, based on known points in a moving image which follows the initial image used in the initial value calculating step, or characteristic points in which three-dimensional coordinates are already calculated; an exterior orientation parameter correcting step for correcting the exterior orientation parameters calculated in the exterior orientation parameter-calculating step, based on difference between photographing timing of the image and obtaining timing of the photographing position and/or the photographing posture measured outside; a bundle-adjusting step for simultaneously adjusting a bundle of the exterior orientation parameters of one or more images and the three-dimensional coordinates of the characteristic points, based on the exterior orientation parameters corrected in the exterior orientation parameter correcting step; a three-dimensional coordinate calculating step for calculating three-dimensional coordinates of characteristic points subsequently detected in an area in which the density of the characteristic points is decreased, based on the exterior orientation parameters adjusted bundle thereof; and a repeating step for repeating processing from the exterior orientation parameter-calculating step to the three-dimensional coordinate calculating step until the image becomes a final image.

According to the invention according to claim 14, the exterior orientation parameters are suitably corrected, even when the photographing timing of the image and the obtaining timing of the photographing position and/or the photographing posture measured outside are not synchronized, and therefore, the errors are decreased.

The present invention according to claim 15 is characterized in that a position measurement device includes: a moving image obtaining unit for obtaining a moving image that is photographed by relatively shifting a photographing section and a photographed object incrementally; a characteristic point detecting and tracking unit for sequentially inputting the images obtained by the moving image obtaining unit and for detecting and tracking characteristic points from the images; a position measuring unit for measuring photographing position of the moving image obtaining unit from the outside; a posture measuring unit for measuring photographing posture of the moving image obtaining unit from the outside; and a computer processing unit for inputting the moving image obtained by the moving image obtaining unit, the characteristic points detected and tracked by the characteristic point detecting and tracking unit, the photographing position measured by the position measuring unit, and the photographing posture measured by the posture measuring unit, and for calculating exterior orientation parameters, which are the photographing position and the photographing posture of the moving image, and three-dimensional coordinates of the characteristic points. The computer processing unit includes: an initial value calculating section for calculating initial values of the exterior orientation parameters, which are a photographing position and a photographing posture, based on known points in an initial image or the photographing position measured by the position measuring unit and the photographing posture measured by the posture measuring unit; an exterior orientation parameter calculating section for calculating exterior orientation parameters based on known points in a moving image which follows the initial image used in the initial value calculating section, or characteristic points in which three-dimensional coordinates are already calculated; an exterior orientation parameter correcting section for correcting the exterior orientation parameters calculated by the exterior orientation parameter calculating section, based on difference between photographing timing of the image and obtaining timing of the photographing position measured by the position measuring unit and/or the photographing posture measured by the posture measuring unit; a bundle adjusting section for simultaneously adjusting a bundle of the exterior orientation parameters of one or more images and the three-dimensional coordinates of the characteristic points, based on the exterior orientation parameters corrected by the exterior orientation parameter correcting section; and a three-dimensional coordinate calculating section for calculating three-dimensional coordinates of characteristic points subsequently detected in an area in which the density of the characteristic points is decreased, based on the exterior orientation parameters adjusted bundle thereof. The process from the exterior orientation parameter calculating section to the three-dimensional coordinate calculating section is repeated until the image becomes a final image.

According to the invention according to claim 15, the exterior orientation parameters are suitably corrected even when the photographing timing of the image and the obtaining timing of the photographing position and/or the photographing posture measured outside are not synchronized, and therefore, the errors are decreased.

The present invention according to claim 16 is characterized in that a position measurement method includes: an initial value calculating step for calculating initial values of exterior orientation parameters, which are a photographing position and a photographing posture, based on known points in an initial image or a photographing position and/or a photographing posture measured outside; an exterior orientation parameter-calculating step for calculating exterior orientation parameters, based on known points in a moving image which follows the initial image used in the initial value calculating step, or characteristic points in which three-dimensional coordinates are already calculated; an exterior orientation parameter evaluating step for evaluating the exterior orientation parameters calculated in the exterior orientation parameter-calculating step, based on at least one selected from the group consisting of track directions of the characteristic points, track distances of the characteristic points, a distribution rate of the characteristic points, an overlapping rate of the characteristic points, and a vertical parallax; a bundle-adjusting step for simultaneously adjusting a bundle of the exterior orientation parameters of one or more images and the three-dimensional coordinates of the characteristic points, based on the exterior orientation parameters corrected in the exterior orientation parameter evaluating step; a three-dimensional coordinate calculating step for calculating three-dimensional coordinates of characteristic points subsequently detected in an area in which the density of the characteristic points is decreased, based on the exterior orientation parameters adjusted bundle thereof; and a repeating step for repeating processing from the exterior orientation parameter-calculating step to the three-dimensional coordinate calculating step until the image becomes a final image.

According to the invention according to claim 16, change of photographing scenes or shift of photographing unit can be evaluated based on at least one selected from the group consisting of the track directions of the characteristic points, the track distances of the characteristic points, the distribution rate of the characteristic points, the overlapping rate of the characteristic points, and the vertical parallax. The change of photographing scenes and the shift of photographing unit make difficult to track the characteristic points, and decrease the accuracy of the exterior orientation parameters calculated from the images. Therefore, when the change of photographing scenes or the shift of photographing unit is relatively large, the exterior orientation parameters calculated from the images are evaluated to have low reliability, and in contrast, when the change of photographing scenes or the shift of photographing unit is relatively small, the exterior orientation parameters calculated from the images are evaluated to have high reliability.

In the case in which the exterior orientation parameters calculated from the images are evaluated to have low reliability, the photographing position and the photographing posture measured outside are used, and the exterior orientation parameters calculated from the images are not used. According to this aspect, the errors due to the change of photographing scenes and the shift of photographing unit can be decreased.

The present invention according to claim 17 is characterized in that in the invention according to claim 16, the track directions of the characteristic points and the track distances of the characteristic points are calculated based on difference between tracks of corresponding points which correspond to the characteristic points in a prior image and tracks of the characteristic points subsequently detected in an image to be processed.

According to the invention according to claim 17, the change of the photographing scenes and the shift of the photographing unit can be easily detected. In the current image to be processed, there are the corresponding points which correspond to the characteristic points in the prior image and the characteristic points subsequently detected. In the case in which the photographing scene changes or the photographing unit shifts, the track direction and the track distance of the corresponding points are different from those of the subsequently detected characteristic points.

The present invention according to claim 18 is characterized in that in the invention according to claim 16, the distribution rate of the characteristic points and the overlapping rate of the characteristic points are calculated by using total value of X coordinates and/or Y coordinates of the characteristic points when an origin is set at the center of the image.

According to the invention according to claim 18, the change of photographing scenes or the shift of the photographing unit can be easily detected.

The present invention according to claim 19 is characterized in that in the invention according to claim 16, the exterior orientation parameter evaluating step evaluates the exterior orientation parameters based on a value obtained by multiplying more than one value selected from the group consisting of the track directions of the characteristic points, the track distances of the characteristic points, the distribution rate of the characteristic points, the overlapping rate of the characteristic points, and the vertical parallax.

According to the invention according to claim 19, the change of photographing scenes or the shift of the photographing unit can be detected by one parameter.

The present invention according to claim 20 is characterized in that in the invention according to claim 16, the bundle-adjusting step bundle-adjusts the photographing position and/or the photographing posture measured outside and the exterior orientation parameters and the three-dimensional coordinates of the characteristic points by calculating weights thereof and by weighting each data.

According to the invention according to claim 20, the photographing position and/or the photographing posture measured outside is simultaneously bundle-adjusted also in addition to the exterior orientation parameters and the three-dimensional coordinates of the characteristic points. In this case, data having low accuracy are lightly processed and data having high accuracy are heavily processed, since the data are weighted to bundle-adjust. As a result, the errors of the exterior orientation parameters and the three-dimensional coordinates of the characteristic points are decreased.

The present invention according to claim 21 is characterized in that in the invention according to claim 20, the weight of the photographing position and/or the photographing posture measured outside is calculated based on difference between photographing timing of the image and obtaining timing of the photographing position and/or the photographing posture measured outside.

According to the invention according to claim 21, the errors of the exterior orientation parameters and the three-dimensional coordinates of the characteristic points are decreased even when the photographing timing of the image and the obtaining timing of the photographing position and/or the photographing posture measured outside are not synchronized.

The present invention according to claim 22 is characterized in that in the invention according to claim 20, the weights of the exterior orientation parameters and the three-dimensional coordinates of the characteristic points are calculated based on at least one selected from the group consisting of the track directions of the characteristic points, the track distances of the characteristic points, the distribution rate of the characteristic points, the overlapping rate of the characteristic points, and the vertical parallax.

According to the invention according to claim 22, the errors of the exterior orientation parameters and the three-dimensional coordinates of the characteristic points are decreased.

The present invention according to claim 23 is characterized in that in the invention according to claim 20, the bundle-adjusting step is performed before the calculation of the three-dimensional coordinates of the characteristic points subsequently detected or after the calculation of the three-dimensional coordinates of the characteristic points subsequently detected.

According to the invention according to claim 23, when the bundle-adjusting step is performed before the three-dimensional coordinates of the characteristic points subsequently detected is calculated, the calculation accuracy of the three-dimensional coordinates of the characteristic points subsequently detected is improved. On the other hand, when the bundle-adjusting step is performed after the three-dimensional coordinates of the characteristic points subsequently detected is calculated, the three-dimensional coordinates of the characteristic points subsequently detected is calculated based on the evaluated exterior orientation parameters, and as a result, a similar effect is obtained.

The present invention according to claim 24 is characterized in that the invention according to claim 16 further includes a miscorresponding point removing step for removing miscorresponding points based on residual between image coordinates of corresponding points calculated by tracking the characteristic points and image coordinates which project three-dimensional coordinates of the corresponding points on the image.

According to the invention according to claim 24, the errors of the exterior orientation parameters and the characteristic points of the three-dimensional coordinates are reduced, since the miscorresponding points are removed even when the miscorresponding points are included in a tracked result of the characteristic points.

The present invention according to claim 25 is characterized in that the invention according to claim 16 further includes a miscorresponding point removing step for projecting three-dimensional coordinates of corresponding points in prior and subsequent images on a stereo image and for removing miscorresponding points based on difference of coordinate values in a direction intersecting a baseline direction of prior and subsequent stereo images at right angle.

According to the invention according to claim 25, the errors of the exterior orientation parameters and the characteristic points of the three-dimensional coordinates are reduced, since the miscorresponding points are removed even when the miscorresponding points are included in a tracked result of the characteristic points.

The present invention according to claim 26 is characterized in that in the invention according to claim 24 or 25, the miscorresponding point removing step is performed after the bundle-adjusting step or before the exterior orientation parameter-calculating step.

According to the invention according to claim 26, when the miscorresponding point removing step is performed after the bundle-adjusting step, the calculation accuracy of the exterior orientation parameters of subsequent images is improved. On the other hand, when the miscorresponding point removing step is performed before the exterior orientation parameter-calculating step, the errors of the exterior orientation parameters are decreased, since the exterior orientation parameters are not calculated based on the miscorresponding points.

The present invention according to claim 27 is characterized in that in the invention according to claim 24 or 25, the miscorresponding point removing step according to claim 24 or 25 is selected based on change in photographing conditions.

According to the invention according to claim 27, the exterior orientation parameters and the three-dimensional coordinates of the characteristic points can be calculated without depending on the change of the photographing conditions.

The present invention according to claim 28 is characterized in that in the invention according to claim 24 or 25, the miscorresponding point removing step estimates threshold value by an LMedS estimation method.

According to the invention according to claim 28, compared to a least-squares method, the LMedS estimation method can robustly estimate outliers even when the data includes numerous outliers. Therefore, the errors of the exterior orientation parameters and the three-dimensional coordinates of the characteristic points are decreased.

The present invention according to claim 29 is characterized in that a position measurement program runs the following steps including: an initial value calculating step for calculating initial values of exterior orientation parameters, which are a photographing position and a photographing posture, based on known points in an initial image or a photographing position and/or a photographing posture measured outside; an exterior orientation parameter-calculating step for calculating exterior orientation parameters based on known points in a moving image which follows the initial image used in the initial value calculating step, or characteristic points in which three-dimensional coordinates are already calculated; an exterior orientation parameter evaluating step for evaluating the exterior orientation parameters calculated in the exterior orientation parameter-calculating step based on at least one selected from the group consisting of track directions of the characteristic points, track distances of the characteristic points, a distribution rate of the characteristic points, an overlapping rate of the characteristic points, and a vertical parallax; a bundle-adjusting step for simultaneously adjusting a bundle of the exterior orientation parameters of one or more images and the three-dimensional coordinates of the characteristic points, based on the exterior orientation parameters corrected in the exterior orientation parameter evaluating step; a three-dimensional coordinate calculating step for calculating three-dimensional coordinates of characteristic points subsequently detected in an area in which the density of the characteristic points is decreased, based on the exterior orientation parameters adjusted bundle thereof; and a repeating step for repeating processing from the exterior orientation parameter-calculating step to the three-dimensional coordinate calculating step until the image becomes a final image.

According to the invention according to claim 29, change of photographing scenes or shift of photographing unit can be evaluated, based on at least one selected from the group consisting of the track directions of the characteristic points, the track distances of the characteristic points, the distribution rate of the characteristic points, the overlapping rate of the characteristic points, and the vertical parallax. Therefore, the errors due to the change of photographing scenes or the shift of photographing unit can be decreased.

The present invention according to claim 30 is characterized in that a position measurement device includes a moving image obtaining unit for obtaining a moving image that is photographed by relatively shifting a photographing section and a photographed object incrementally; a characteristic point detecting and tracking unit for sequentially inputting images obtained by the moving image obtaining unit and for detecting and tracking the characteristic points from the images; a position measuring unit for measuring photographing position of the moving image obtaining unit from the outside; a posture measuring unit for measuring photographing posture of the moving image obtaining unit from the outside; and a computer processing unit for inputting the moving image obtained by the moving image obtaining unit, the characteristic points detected and tracked by the characteristic point detecting and tracking unit, the photographing position measured by the position measuring unit, and the photographing posture measured by the posture measuring unit, and for calculating exterior orientation parameters, which are the photographing position and the photographing posture of the moving image, and three-dimensional coordinates of the characteristic points. The computer processing unit includes an initial value calculating section for calculating initial values of the exterior orientation parameters, which are a photographing position and a photographing posture, based on known points in an initial image or the photographing position measured by the position measuring unit and the photographing posture measured by the posture measuring unit; an exterior orientation parameter calculating section for calculating exterior orientation parameters, based on known points in a moving image which follows the initial image used in the initial value calculating section, or characteristic points in which three-dimensional coordinates are already calculated; exterior orientation parameters evaluating section for evaluating the exterior orientation parameters calculated by the exterior orientation parameter calculating section, based on at least one selected from the group consisting of track directions of the characteristic points, track distances of the characteristic points, a distribution rate of the characteristic points, an overlapping rate of the characteristic points, and a vertical parallax; a bundle adjusting section for simultaneously adjusting a bundle of the exterior orientation parameters of one or more images and the three-dimensional coordinates of the characteristic points, based on the exterior orientation parameters corrected by the exterior orientation parameters evaluating section; and a three-dimensional coordinate calculating section for calculating three-dimensional coordinates of characteristic points subsequently detected in an area in which the density of the characteristic points is decreased, based on the exterior orientation parameters adjusted bundle thereof. The process from the exterior orientation parameter calculating section to the three-dimensional coordinate calculating section is repeated until the image becomes a final image.

According to the invention according to claim 30, change of photographing scenes or shift of photographing unit can be evaluated, based on at least one selected from the group consisting of the track directions of the characteristic points, the track distances of the characteristic points, the distribution rate of the characteristic points, the overlapping rate of the characteristic points, and the vertical parallax. Therefore, the errors due to the change of photographing scenes or the shift of photographing unit can be decreased.

According to the present invention, in the position measuring technique which measures photographing positions, photographing postures, and three-dimensional positions of objects based on moving images, the errors can be reduced.

BRIEF DESCRIPTION OF THE DRAWINGS

FIG. 21A is a flow chart for removing miscorresponding points by using a backward projection, and FIG. 21B is a flow chart for removing miscorresponding points by using a vertical parallax.

DETAILED DESCRIPTION OF THE PREFERRED EMBODIMENTS

1. First Embodiment

An example of a position measurement method, a position measurement device, and a program therefor will be described with reference to the drawings hereinafter.

Structure of a Position Measurement Device

Figure 1:
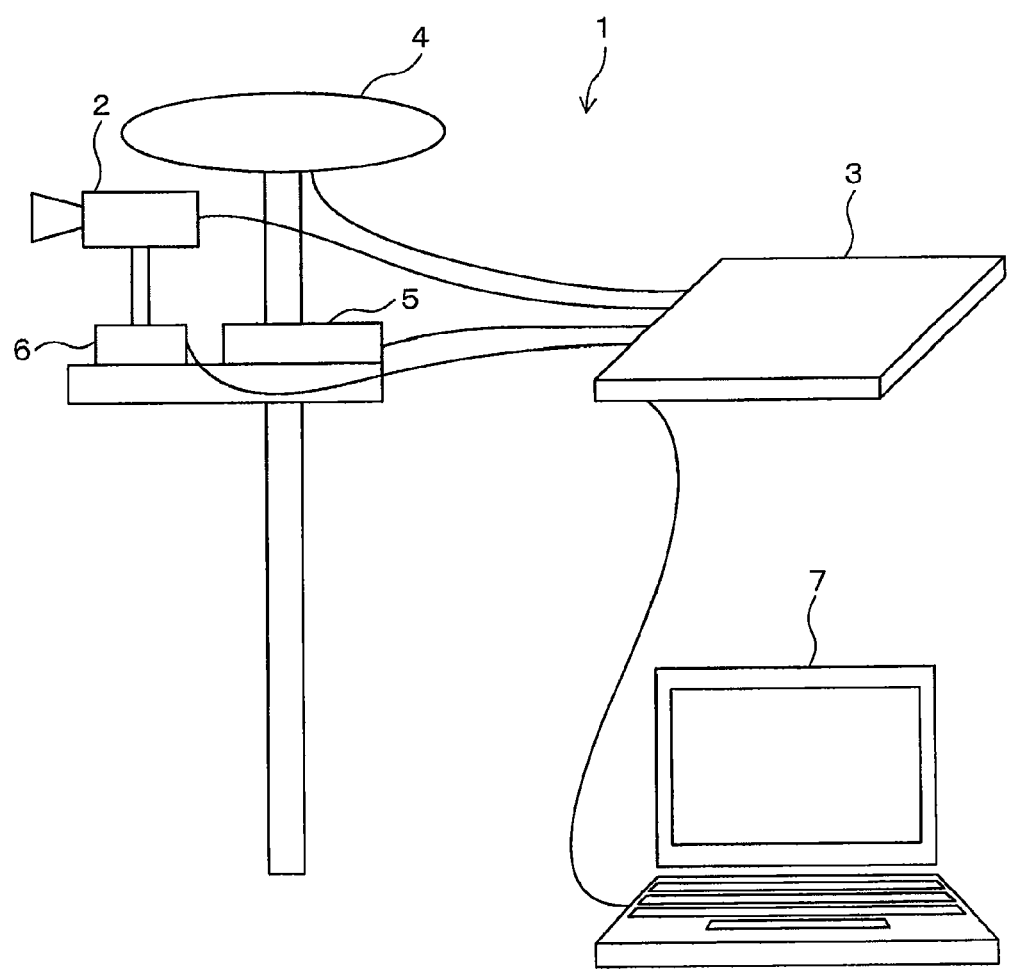
FIG. 1 is an overview of a position measurement device.
Figure 2:
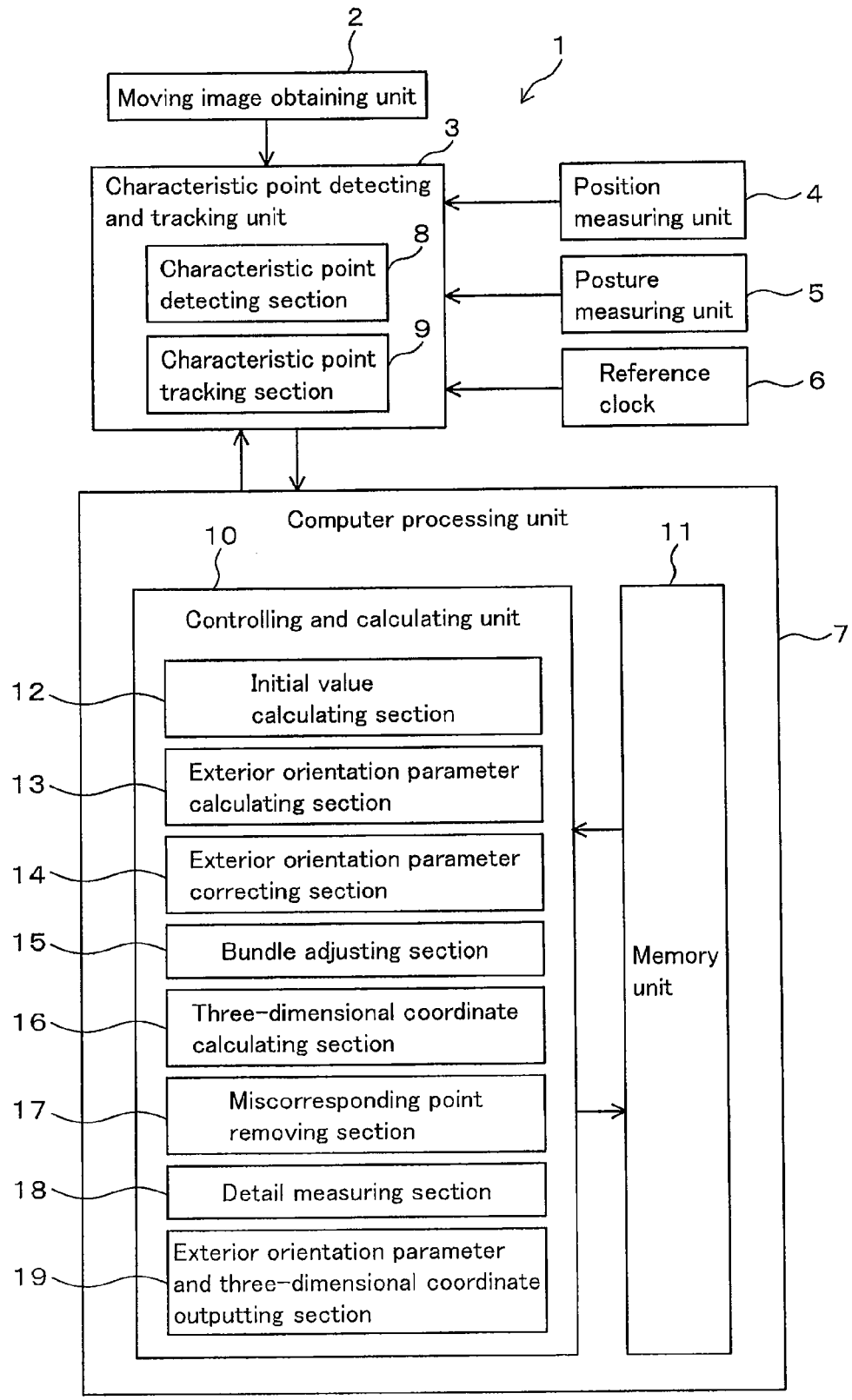
FIG. 2 is a functional block diagram of a position measurement device.

FIG. 1 is an overview of a position measurement device, and FIG. 2 is a functional block diagram of a position measurement device. A position measurement device 1 includes a moving image obtaining unit 2, a characteristic point detecting and tracking unit 3, a position measuring unit 4, a posture measuring unit 5, a reference clock 6, and a computer processing unit 7.

The moving image obtaining unit 2 includes a camera for taking moving images, such as a video camera, a CCD camera (Charge Coupled Device Camera) for industrial measurement, and a CMOS camera (Complementary Metal Oxide Semiconductor Camera). The moving image obtaining unit 2 may include a camera for taking still images. In this case, an object is photographed while the object and the camera are relatively shifted incrementally, and plural still images are obtained.

The characteristic point detecting and tracking unit 3 is made of a characteristic point detecting section 8 and a characteristic point tracking section 9. The characteristic point detecting section 8 detects characteristic points from a moving image obtained by the moving image obtaining unit 2. The characteristic point tracking section 9 tracks corresponding points, which correspond to the characteristic points detected by the characteristic point detecting section 8, in another image. The characteristic point detecting section 8 and the characteristic point tracking section 9 are mounted in the form of firmware such as ASIC (Application Specific Integrated Circuit) and FPGA (Field Programmable Gate Array). The characteristic point detecting section 8 and the characteristic point tracking section 9 may be made of software which is executed on a general-purpose computer.

The position measuring unit 4 is made of a GPS (Global Positioning System) receiver, an IMU (Inertial Measurement Unit), and the like. The position measuring unit 4 is used for measuring a position of a camera (projection center). By combining the GPS and the IMU based on photographing conditions, exterior orientation parameters calculated from an image are appropriately corrected. The offset between the mounting position of the position measuring unit 4 and the mounting position of the camera is preliminarily set.

The posture measuring unit 5 is made of a posture sensor such as a gyroscope, an IMU, an acceleration meter, an angular rate meter, an angular accelerometer, and combinations thereof. By combining these measuring parts based on photographing conditions, the exterior orientation parameters calculated from an image are appropriately corrected. The posture measuring unit 5 is used for measuring posture of the camera.

The reference clock 6 is made of a crystal oscillator, a rubidium oscillator, a radio-controlled clock, or the like. The reference clock 6 converts the time of the moving image obtaining unit 2, the time of the position measuring unit 4, and the time of the posture measuring unit 5, to have the same time axis.

The computer processing unit 7 is made of a PC (Personal Computer). The computer processing unit 7 includes a controlling and calculating unit 10 and a memory unit 11. The controlling and calculating unit 10 is made of a CPU (Central Processing Unit), and the memory unit 11 is made of a semiconductor memory device such as a RAM (Random Access Memory) and a ROM (Read Only Memory), a magnetic-storage device, or the like. The memory unit 11 stores operating systems and position measurement programs, and the controlling and calculating unit 10 reads and executes the programs.

The position measurement program is made of an initial value calculating section 12, an exterior orientation parameter calculating section 13, an exterior orientation parameter correcting section 14, a bundle adjusting section 15, a three-dimensional coordinate calculating section 16, a miscorresponding point removing section 17, a detail measuring section 18, and an exterior orientation parameter and three-dimensional coordinate outputting section 19. The position measurement program can be provided by recording media such as a CD-ROM.

The initial value calculating section 12 calculates initial values of interior orientation parameters of the camera (focal point distance, principal point position (misalignment of center of optical axis), lens distortion coefficient) and exterior orientation parameters (position and posture of the camera). This calculation is based on three-dimensional coordinates of a reference point measured by a total station or a GPS, and is also based on image coordinates of the reference point in an image in which the reference point is photographed.

The exterior orientation parameter calculating section 13 calculates exterior orientation parameters based on a backward intersection method or a relative orientation method. In the backward intersection method, directions from an unknown point to at least three known points are observed, and the position of the unknown point is fixed as an intersection point of these directional lines. As the backward intersection method, a single photo orientation or a DLT method (Direct Linear Transformation Method) may be used.

The exterior orientation parameter correcting section 14 corrects the exterior orientation parameters calculated from the image, according to the difference of the photographing timing of the image and the obtaining timing of the positional data and the postural data. The positional data is obtained by the position measuring unit 4 and the postural data is obtained by the posture measuring unit 5.

The bundle adjusting section 15 adjusts the corrected exterior orientation parameters and the three-dimensional coordinates of the characteristic points in one or more images, or all images, at the same time.

The three-dimensional coordinate calculating section 16 calculates three-dimensional coordinates of subsequently detected characteristic points based on a forward intersection method. In the forward intersection method, directions from at least two known points to an unknown point are observed, and the position of the unknown point is fixed as an intersection point of these directional lines. The bundle adjustment is performed before or after the calculation of the three-dimensional coordinates of the subsequently detected characteristic points.

The miscorresponding point removing section 17 removes points having relatively large error among tracked corresponding points by a backward projection or by using vertical parallaxes calculated from a relative orientation. In the backward projection, error points are removed according to residual values of image coordinates, which are calculated from the three-dimensional coordinates of the characteristic points based on the backward intersection method, and image coordinates of the tracked corresponding points. In the relative orientation, exterior orientation parameters are calculated by using at least six corresponding points in right and left images. The vertical parallax is a difference of y-coordinates of corresponding points in two images that are stereographed, that is, a difference of coordinate values in a direction intersecting a baseline direction of the stereo images at a right angle. The stereo images are a pair of images and are made of two images photographed by cameras in a condition in which the optical axes are parallel, and directions intersecting a baseline direction at a right angle are parallel.

The detail measuring section 18 executes three-dimensional modeling. The three-dimensional modeling is used for forming a three-dimensional object of a photographed object. The detail measuring section 18 calculates contours and surfaces from the three-dimensional coordinates of the characteristic points and thereby forming a wire-frame model and a surface model. The surface model has surfaces to which two-dimensional images are texture-mapped. Moreover, the detail measuring section 18 performs texture analysis based on the mapped texture and calculates three-dimensional coordinates of characteristic portions of the texture. The three-dimensional coordinates of the characteristic portions of the texture are bundle adjusted and are corrected to be optimum value.

The exterior orientation parameter and three-dimensional coordinate outputting section 19 outputs data of the exterior orientation parameters and data of the three-dimensional coordinates of the characteristic points or the characteristic portions of the texture.

Operation of the Position Measurement Device

Figure 3:
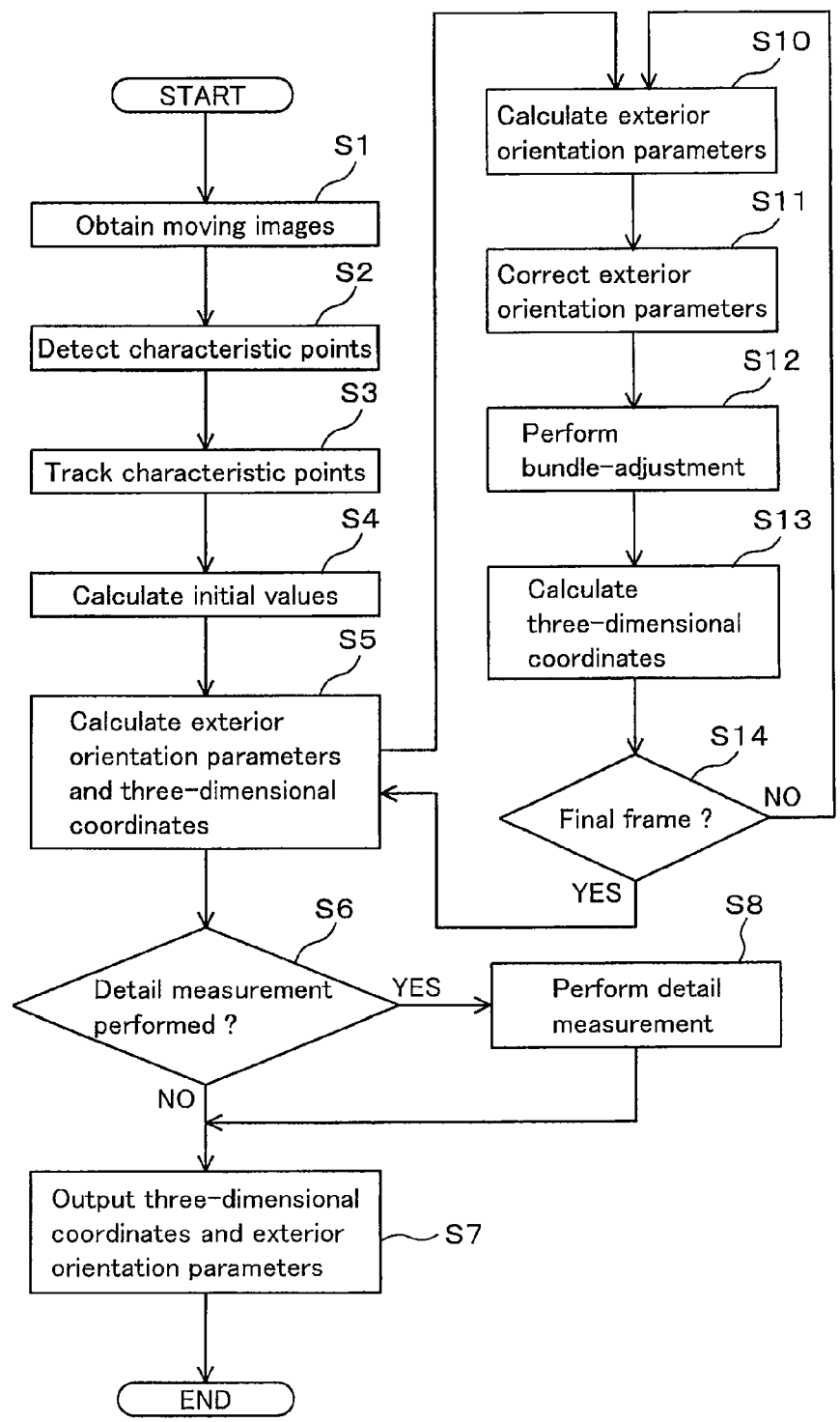
FIG. 3 is a flow chart showing a process of a position measurement device.
Figure 4:
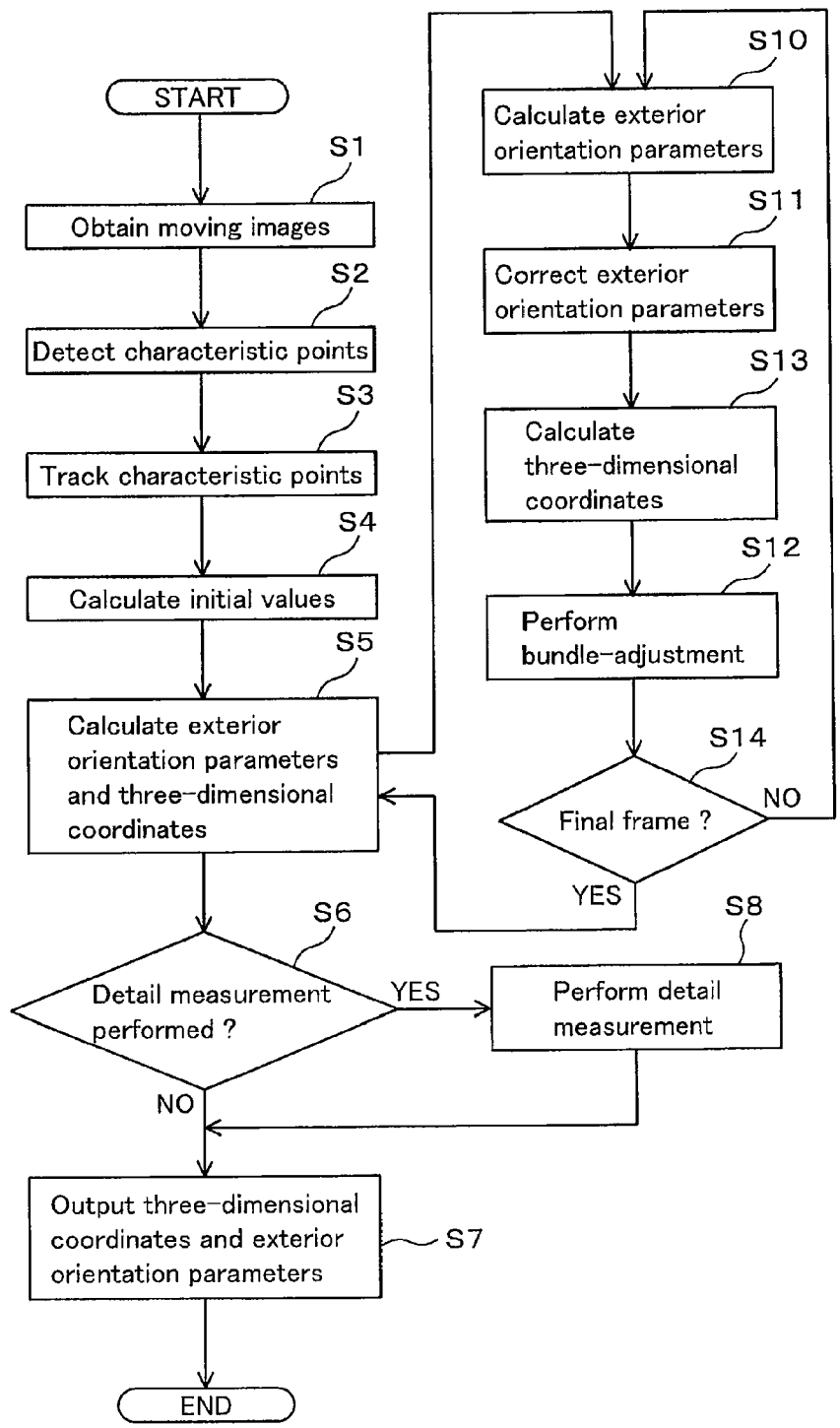
FIG. 4 is a flow chart showing a process of a position measurement device.

Next, overall operation of a position measurement device will be described. FIGS. 3 and 4 are flow charts showing operation of a position measurement device.

First, the moving image obtaining unit 2 obtains moving images (step S1). The moving images are plural continuous images photographed by relatively shifting the moving image obtaining unit 2 and an object incrementally. The plural continuous images are sequentially input to the characteristic point detecting and tracking unit 3.

The characteristic point detecting section 8 detects characteristic points in the image input to the characteristic point detecting and tracking unit 3 (step S2). In the detection of the characteristic points, a filter such as a Moravec filter, a Laplacian filter, and a Sobel filter, is used. Then, the characteristic point tracking section 9 tracks corresponding points, which correspond to the characteristic points, in a subsequent image (step S3). In the tracking of the characteristic points, template matching is used. As the template matching, a SSDA method (Sequential Similarity Detection Algorithm) or a cross-correlation coefficient method may be used.

In the image in which the characteristic points are tracked, the characteristic point detecting section 8 detects more characteristic points in an area in which the density of the characteristic points is decreased. The step S2 for detecting characteristic points and the step S3 for tracking the characteristic points are repeated in the continuous images. The information related to the characteristic points is embedded in each image. The image embedded with the information related to the characteristic points is sequentially output to the computer processing unit 7. The details of the processes of the step S2 and the step S3 are disclosed in Japanese Patent Application Laid-Open No. 2007-147457 and Japanese Patent Application Laid-Open No. 2007-183256.

Then, in the computer processing unit 7, initial values of interior orientation parameters and exterior orientation parameters of the camera are calculated from an image photographed with a reference point (step S4). Before the step S4, an operator needs to set a reference point in an objective space and photograph the reference point. In addition, the operator needs to measure three-dimensional coordinates of the reference point in a real space by a total station or a GPS. In the calculation of the initial values in the step S4, the operator calculates initial values of interior orientation parameters and exterior orientation parameters of the camera by the backward intersection method based on the three-dimensional coordinates and the image coordinates of the reference point. Alternatively, the initial values of the exterior orientation parameters may be calculated from stereo images photographed at plural positions, by using the total station or the GPS for providing three-dimensional coordinate values of the plural positions instead of the three-dimensional coordinate values of the characteristic points.

Alternatively, the operator may photograph plural images by moving a reference plate, in which plural reference points are drawn, without using the total station and the GPS. The distances between the reference points drawn in the reference plate are known values. In this case, in the calculation of the initial values in the step S4, image coordinates of the reference points are calculated from the plural images, which are photographed with the reference points, and the initial values of the position and the posture of the camera are obtained by using relative orientation. It should be noted that the coordinates are in a local coordinate system.

Next, exterior orientation parameters, and three-dimensional coordinates of the subsequently detected characteristic points, are calculated in each of the images that were input (step S5). In the calculation of the exterior orientation parameters, the backward intersection method or the relative orientation method is used. In the calculation of the three-dimensional coordinates of the subsequently detected characteristic points, the forward intersection method is used. This process is performed on all of the images. The detail of this process will be described later.

In order to measure more detail (step S6), a detail measurement is performed (step S8). In the detail measurement, a formation of a wire-frame model, a formation of a surface model, a texture mapping, and a texture analysis are performed. In the texture analysis, three-dimensional coordinates of characteristic portions of a texture are calculated. The three-dimensional coordinates of the characteristic portions of the texture, and also the exterior orientation parameters and the three-dimensional coordinates of the characteristic points, which are calculated in the step S5, are bundle adjusted and are corrected to be optimum values. After this calculation, the data of the exterior orientation parameters and the three-dimensional coordinates are output (step S7).

The process of calculating the three-dimensional coordinates and the exterior orientation parameters in the step S5 relating to the present invention will be described in detail hereinafter. As shown in FIG. 3, the process of calculating the three-dimensional coordinates and the exterior orientation parameters in the step S5 includes a step of calculation of exterior orientation parameters (step S10), a step of correction of the calculated exterior orientation parameters (step S11), a step of bundle adjustment of the corrected orientation parameters and the three-dimensional coordinates of known points and the characteristic points (step S12), and a step of calculation of three-dimensional coordinates of subsequently detected characteristic points (step S13).

The bundle adjustment (step S12) may be performed before the calculation of the three-dimensional coordinates of the subsequently detected characteristic points (FIG. 3) or after the calculation of the three-dimensional coordinates of the subsequently detected characteristic points (FIG. 4). In the case shown in FIG. 3, the calculation accuracy of the three-dimensional coordinates of the subsequently detected characteristic points is improved. In the case shown in FIG. 4, since the three-dimensional coordinates of the subsequently detected characteristic points are calculated based on the corrected exterior orientation parameters, the function is the same as the function in the case shown in FIG. 3.

(Step S10) Calculation of the Exterior Orientation Parameters

Figure 5:
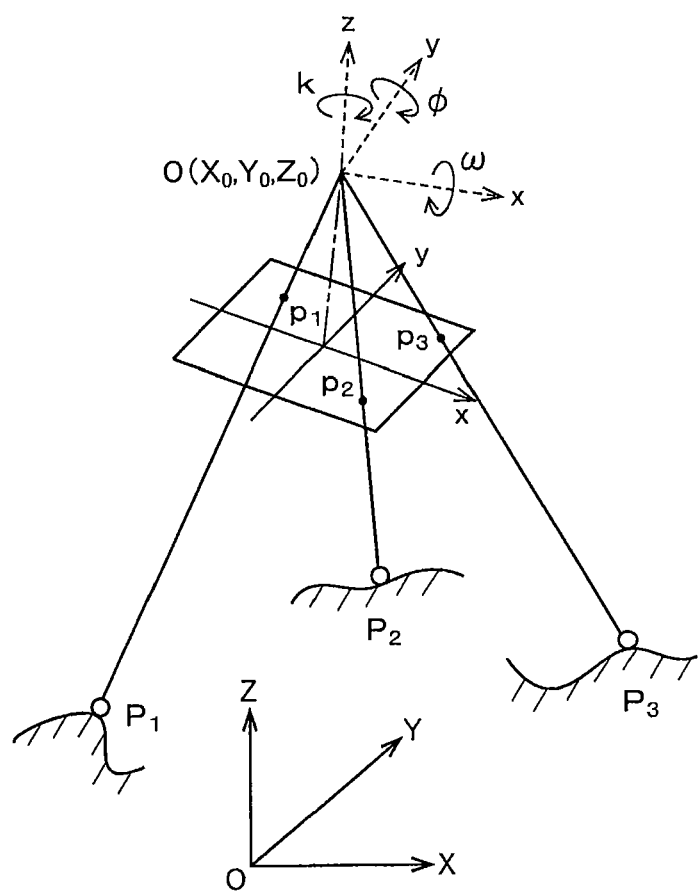
FIG. 5 is an explanatory diagram for explaining a backward intersection method.

FIG. 5 is an explanatory diagram for explaining a backward intersection method. In the backward intersection method, directions from an unknown point O to at least three known points $P_1$, $P_2$, $P_3$ are observed, and the position of the unknown point O is fixed as the intersection point of these directional lines. Exterior orientation parameters ($X_0$, $Y_0$, $Z_0$, $\omega$, $\phi$, $\kappa$) are calculated by the backward intersection method based on three-dimensional coordinates of reference points $P_1$, $P_2$, $P_3$, which are set as initial values (or three-dimensional coordinates calculated in a prior frame). A single photo orientation and a DLT method are used as the backward intersection method and will be described hereinafter.

Single Photo Orientation

In the single photo orientation, a position O ($X_0$, $Y_0$, $Z_0$) and a posture ($\omega$, $\phi$, $\kappa$) of a camera, which is used for taking a photograph, are calculated by using a collinearity condition formed on a reference point in the photograph. The collinearity condition is a condition in which a projection center, a photographic image, and objective points ($Op_1P_1$, $Op_2P_2$, $Op_3P_3$) on the ground are on one straight line. The position O ($X_0$, $Y_0$, $Z_0$) of the camera and the posture ($\omega$, $\phi$, $\kappa$) of the camera are exterior orientation parameters.

First, the camera coordinate system is assumed to be (x, y, z), the photographic coordinate system is assumed to be (x, y), and the ground coordinate system is assumed to be (X, Y, Z). It is assumed that photographs are taken by turning the camera to left by $\omega$, $\phi$, $\kappa$ with respect to the positive direction in each coordinate axis in series. Next, three-dimensional coordinates of reference points corresponding to 4 image coordinates (only 3 points are shown in FIG. 5) are substituted for a second degree perspective projection formula which is represented by a first formula. Then, observation equations are made, and thereby parameters b1 to b8 are calculated.

$$X = \frac{b1 \cdot x + b2 \cdot y + b3}{b7 \cdot x + b8 \cdot y + 1}$$ First Formula $$Y = \frac{b4 \cdot x + b5 \cdot y + b6}{b7 \cdot x + b8 \cdot y + 1}$$

X,Y: Coordinates of reference point x,y: Photographic coordinates

By using the parameters b1 to b8 in the first formula, exterior orientation parameters are calculated from the following second formula.

$\omega = \tan^{-1}(C \cdot b8)$ $\phi = \tan^{-1}(-C \cdot b7 \cdot \cos \omega)$ $\kappa = \tan^{-1}(-b4/b1)$  ($\phi = 0$)

$\kappa = \tan^{-1}(-b2/b5)$  ($\phi \neq 0$, $\omega = 0$)

$\kappa = \tan^{-1}\{-(A1 \cdot A3 - A2 \cdot A4)/(A1 \cdot A2 - A3 \cdot A4)\}$ ($\phi \neq 0$, $\omega \neq 0$)

$Z_0 = C \cdot \cos \omega \{(A2^2 + A3^2)/(A1^2 + A4^2)\}^{1/2} + Zm$ $X_0 = b3 - (\tan \omega \cdot \sin \kappa / \cos \phi - \tan \phi \cdot \cos \kappa) \times (Zm - Z_0)$ $Y_0 = b6 - (\tan \omega \cdot \cos \kappa / \cos \phi - \tan \phi \cdot \sin \kappa) \times (Zm - Z_0)$   Second formula Here, $A1 = 1 + \tan^2 \phi$)
$A2 = B1 + B2 \cdot \tan \phi / \sin \omega$
$A3 = B4 + B5 \cdot \tan \phi / \sin \omega$
$A4 = \tan \phi / (\cos \phi \cdot \tan \omega)$
Zm: Average elevation of four reference points (here, four reference points are coordinates on the same plane, so the elevation is assumed to be fixed.)
C: Focal length DLT Method The DLT method approximates a relationship between image coordinates and three-dimensional coordinates of an objective space by using a third degree perspective projection formula. The basic formula of the DLT method is the following third formula. The detail of the DLT method may be found in "Shunji Murai: Analytical Photogrammetry, pages 46 to 51 and pages 149 to 155".

$$x = \frac{L_1 X + L_2 Y + L_3 Z + L_4}{L_9 X + L_{10} Y + L_{11} Z + 1}$$ Third Formula $$y = \frac{L_5 X + L_6 Y + L_7 Z + L_8}{L_9 X + L_{10} Y + L_{11} Z + 1}$$

x,y: Image coordinates of the reference points or unknown points
X,Y,Z: Ground coordinates of the reference points or unknown points
$L_1$ to $L_{11}$: Unknown parameters in the DLT method By deleting the denominator in the third formula, a linear formula of a fourth formula is derived.

$XL_1 + YL_2 + ZL_3 + L_4 - xXL_9 - xYL_{10} - xZL_{11} = x$ $XL_5 + YL_6 + ZL_7 + L_8 - yXL_9 - yYL_{10} - yZL_{11} = y$   Fourth Formula Moreover, the fourth formula is converted into the following fifth formula.

$$\begin{vmatrix} X & Y & Z & 1 & 0 & 0 & 0 & 0 & -xX & -xY & -xZ \\ 0 & 0 & 0 & 0 & X & Y & Z & 1 & -yX & -yY & -yZ \end{vmatrix} \begin{vmatrix} L_1 \\ L_2 \\ L_3 \\ L_4 \\ L_5 \\ L_6 \\ L_7 \\ L_8 \\ L_9 \\ L_{10} \\ L_{11} \end{vmatrix} = \begin{vmatrix} x \\ y \end{vmatrix}$$   Fifth Formula By substituting three-dimensional coordinates of at least six the reference points for the fifth formula and by solving with the least-squares method, 11 of unknown variables from $L_1$ to $L_{11}$ that determine the relationship between the photographic coordinates and the object coordinates are obtained. The $L_1$ to $L_{11}$ include the exterior orientation parameters.

Next, a calculation of exterior orientation parameters using a relative orientation method will be described. In the relative orientation, relative exterior orientation parameters are obtained even without known points. If there are known points, absolute coordinates are obtained by performing an absolute orientation.

Relative Orientation

Figure 6:
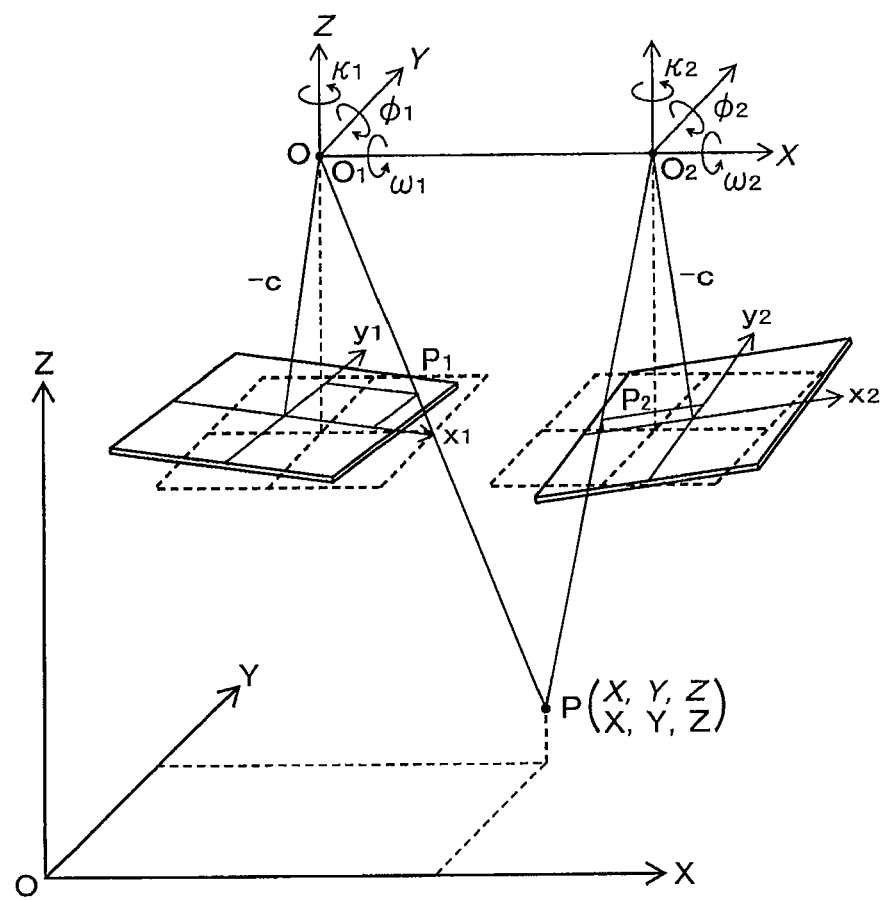
FIG. 6 is an explanatory diagram for explaining a relative orientation.

FIG. 6 is an explanatory diagram for explaining a relative orientation. In the relative orientation, exterior orientation parameters are calculated by using at least six corresponding points in right and left images. In the relative orientation, a coplanar condition such that two light rays connect projection centers $O_1$, $O_2$ and a reference point P must be in the same plane, is used. The coplanar conditional formula is represented in the following sixth formula.

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0$$   Sixth Formula $X_{01}, Y_{01}, Z_{01}$: Coordinates of projected center of the left image $X_{02}, Y_{02}, Z_{02}$: Coordinates of projected center of the right image $X_1, Y_1, Z_1$: Left image coordinates $X_2, Y_2, Z_2$: Right image coordinates As shown in FIG. 6, an origin point of a model coordinate system is assumed to be a projection center $O_1$ on the left image, and a line connecting to a projection center $O_2$ on the right image is assumed to be an X-axis. In scale, the length of the baseline is assumed to be a part length. In this case, five parameters are obtained: a rotary angle $\kappa_1$ of the Z-axis and a rotary angle $\phi_1$ of the Y-axis of the left camera, a rotary angle $\kappa_2$ the Z-axis, a rotary angle $\phi_2$ the Y-axis, and a rotary angle $\omega_2$ the X-axis of the right camera. Since the rotary angle $\omega_1$ of the X-axis of the left camera is zero, it need not be taken into consideration. Under these conditions, the coplanar conditional formula of the sixth formula is converted into the seventh formula, and respective parameters are calculated by solving this seventh formula.

$$F(\kappa_{1'} \quad \phi_{1'} \quad \kappa_{2'} \quad \phi_{2'} \quad \omega_2) = \begin{vmatrix} Y_1 & Z_1 \\ Y_2 & Z_2 \end{vmatrix} \quad \text{Seventh Formula}$$
$$= Y_1 Z_2 - Y_2 Z_1$$
$$= 0$$

$\kappa_1$: Left camera's rotary angle about Z-axis
$\phi_1$: Left camera's rotary angle about Y-axis
$\kappa_2$: Right camera's rotary angle about Z-axis
$\phi_2$: Right camera's rotary angle about Y-axis
$\omega_2$: Right camera's rotary angle about X-axis Here, the following relationship for converting coordinates is formed between the model coordinate system XYZ and the camera coordinate system xyz.

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \quad \text{Eighth Formula}$$
$$\begin{pmatrix} x_1 \\ y_1 \\ -c \end{pmatrix}$$
$$= 0$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi_2 & 0 & \cos\phi_2 \end{pmatrix}$$
$$\begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

Unknown parameters (exterior orientation parameters) are calculated by using the above-described formula according to the steps described below.
(1) Assume initial approximate values of the unknown parameters ($\kappa_1$, $\phi_1$, $\kappa_2$, $\phi_2$, $\omega_2$) to be zero as a rule.
(2) Expand the coplanar conditional formula of the seventh formula using Taylor's formula about the approximate values, and make it linear. Calculate the differential coefficients from the eighths formula, and make observation formulas.
(3) Calculate correction amount for the approximate values by the least-squares method.
(4) Correct the approximate values.
(5) Use the corrected approximate values, and repeat the steps (1) to (4) until the result converges.

When the relative orientation is converged, a successive orientation is then performed. In the successive orientation, the tilt and the scale between each model are unified so as to be in the same coordinate system. When this process is performed, successive differences shown in the following ninth formula are calculated. As a result, if the successive differences $\Delta Z_j$ and $\Delta D_j$ are not more than predetermined values (for example, 0.0005 (1/2000)), it is evaluated that the successive orientation is completed normally.

$$\Delta X_j = (X_{j,r} - X_{j,1})/(Z_0 - Z_{j,1})$$

$$\Delta Y_j = (Y_{j,r} - Y_{j,1})/(Z_0 - Z_{j,1})$$

$$\Delta Z_j = (Z_{j,r} - Z_{j,1})/(Z_0 - Z_{j,1})$$

$$\Delta D_j = \sqrt{(\Delta X_j^2 + \Delta Y_j^2)} \quad \text{Ninth Formula}$$

$(X_{j,1}, Y_{j,1}, Z_{j,1})$: The j-th left model in the unified coordinate system
$(X_{j,r}, Y_{j,r}, Z_{j,r})$: The j-th right model in the unified coordinate system (Step S11) Correction of the Exterior Orientation Parameters Next, the exterior orientation parameters are corrected. The positional data of the position measuring unit 4 and the postural data of the posture measuring unit 5 include the difference between the photographing timing of the image and the obtaining timings of the positional data of the position measuring unit 4 or the postural data of the posture measuring unit 5. The exterior orientation parameters are corrected after this positional data of the position measuring unit 4 and this postural data of the posture measuring unit 5 are evaluated. The method for correcting the exterior orientation parameters (position and posture of the camera) will be described hereinafter.

Correction of the Position of the Camera

The positional data obtained from the position measuring unit 4 (a GPS or an IMU) have specific accuracy according to each device. For example, when the accuracy is represented as $\sigma$, $2\sigma$, $3\sigma$, or the like is used for evaluation values (threshold values) of the positional data of the GPS and the IMU. The positional data of the GPS and the IMU include the error based on the difference between the photographing timing of the image and the obtaining timing of the positional data of the GPS and the IMU. If the positional data of the GPS and the IMU are out of the range of the threshold value, the position of the camera calculated from the image is selected. On the other hand, if these positional data of the GPS and the IMU are in the range of the threshold value, the positional data of the GPS and the IMU are selected. The offset between the mounting position of the camera and the mounting position of the GPS or the IMU is preliminary corrected.

A method for calculating an error in the positional data of the GPS will be described hereinafter. Generally, the time of the GPS is not synchronized with the time of the camera. This is because synchronization of the time of the GPS and the time of the camera requires a large investment and therefore is practically difficult to realize. Therefore, in the present invention, the obtaining time of the positional data of the GPS and the photographing time of the image are converted to a reference time output from the reference clock 6. The converted time compensates transmission delay of the positional data and transmission delay of the image data.

The frame rate of the moving image do not coincide with the obtaining rate of the positional data of the GPS, whereby the photographing timing of the image do not synchronize with the obtaining timing of the positional data of the GPS. Therefore, the error in the positional data of the GPS includes the error based on the difference between the photographing timing of the image and the obtaining timing of the positional data of the GPS.

Figure 7A:
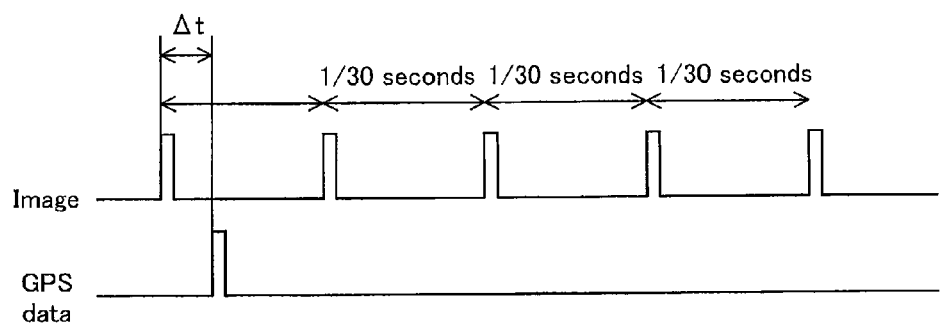
FIG. 7A is a timing chart in a case in which a photographing timing of an image is not synchronized with obtaining timing of positional data of a GPS.
Figure 7B:
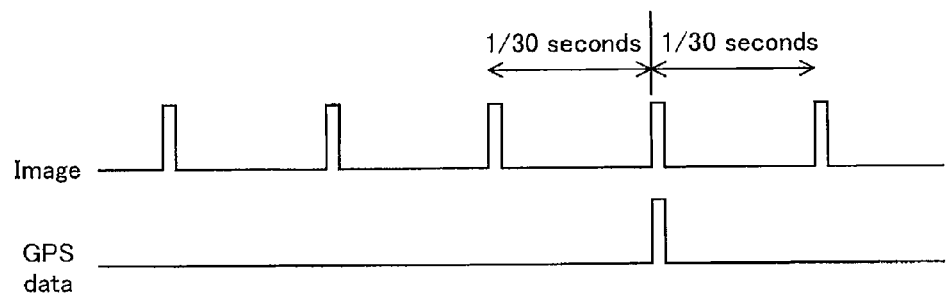
FIG. 7B is a timing chart in a case in which a photographing timing of an image is synchronized with obtaining timing of positional data of a GPS.

FIG. 7A is a timing chart in a case in which a photographing timing of an image is not synchronized with obtaining timing of positional data of a GPS, and FIG. 7B is a timing chart in a case in which a photographing timing of an image is synchronized with obtaining timing of positional data of a GPS.

As shown in FIG. 7A, it is assumed that the difference of the photographing timing of the image and the obtaining timing of the positional data of the GPS is represented as Δt. When the camera moves at a rate v, an error Et in the positional data of the GPS is represented as the following tenth formula.

$$Et = v\Delta t \qquad \text{Tenth Formula}$$

When the reference clock 6 is not used, the value of Δt in the tenth formula is usually unknown. In this case, if the frame rate of the moving image is set to be 30 fps, and the obtaining rate of the positional data of the GPS is set to be 1 fps, it can be assumed that the value of Δt is plus or minus 1/30 seconds at most as shown in FIG. 7B. The position measurement device may be structured to change the value of Δt.

When the reference clock 6 is used, the photographing time of the image and the obtaining time of the positional data of the GPS are represented by the same time axis according to the reference clock 6. Therefore, the time difference between the obtaining time of the positional data of the GPS and the photographing time of an image, which is photographed at a time nearest to the obtaining time, is represented as Δt. The value of Δt shown in FIG. 7A is obtained by calculating a difference of the photographing time of the image and the obtaining time of the positional data of the GPS.

The rate v is calculated from a moving distance of the characteristic point in the moving image and the frame rate of the moving image. The following eleventh formula is a formula for computation of the rate v. For example, when $(X_i - X_{i-1}) = 0.1$ m, and the frame rate is 30 fps, v=3 m/seconds. Accordingly, the error Et in the positional data of the GPS comes to $3 \times (1/30) = 0.1$ m.

$$v = (X_i - X_{i-1}) \times fps \qquad \text{Eleventh Formula}$$

$X_i$: Position coordinate of the characteristic point in i frame
$X_{i-1}$: Position coordinate of the characteristic point in i-1 frame
fps: Frame rate (frame/sec)

Moreover, positioning accuracy specific for the GPS is evaluated. The positioning accuracy of the GPS varies depending on values of a satellite position (DOP: Dilution of Precision), multipath, link quality (LQ), convergence estimation of positioning calculation, and the like. For example, in a case of a RTK-GPS (Real Time Kinematic GPS) system, a positioning mode is changed in real time according to a position of a GPS satellite, effects of multipath affected by surrounding environment, correction information from a control station, and the like. The following Table 1 schematically shows positioning accuracy in each positioning mode.

TABLE 1

| | |
|---|---|
| Stand-alone positioning mode | Positioning accuracy 3 to 10 m |
| C/A code RTK positioning mode | Positioning accuracy 1 to 3 m |
| RTK-float posiitoning mode | Positioning accuracy 0.6 to 1 m |
| RTK-fix positioning mode | Positioning accuracy 0.01 to 0.03 m |

Therefore, if the positioning accuracy of the GPS is represented as $GPS_{rtke}$, a total error $Et_{ALL}$ in the positional data of the GPS including the difference of the photographing timing of the image and the obtaining timing of the positional data of the GPS is represented by a twelfth formula. For example, when Et=0.1 m, and $GPS_{rtke}$=0.03 m in the RTK-fix positioning mode, the total error in the positional data of the GPS comes to $Et_{ALL}$=0.13 m. When a threshold is set to be 3σ in the RTK-fix positioning mode, the threshold value comes to $0.03 \times 3 = 0.09$ m. In this case, since the value of $Et_{ALL}$ is greater than the threshold value, the exterior orientation parameters (position of the camera) calculated from the image is used instead of the positional data of the GPS.

$$Et_{ALL} = Et + GPS_{rtke} \qquad \text{Twelfth Formula}$$

Whether the exterior orientation parameters (position of the camera) will be corrected or not may be selected depending on which positioning mode is used for measuring the positional data of the GPS, among the positioning mode shown in the Table 1. For example, only the RTK-fix positioning mode is selected to be used. In this case, the exterior orientation parameters calculated from the image are selected.

Figure 8A:
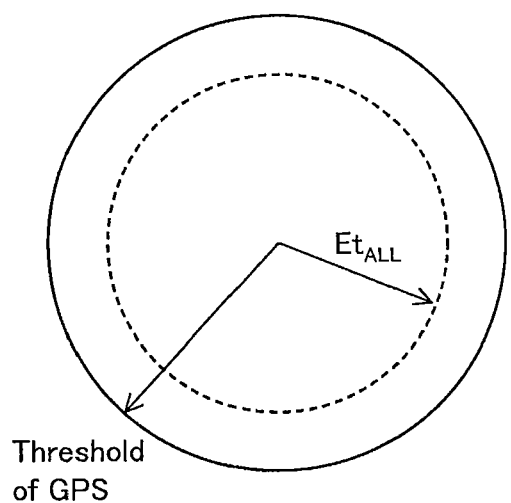
FIG. 8A shows a case in which positional data of a GPS is in the range of a predetermined threshold value.
Figure 8B:
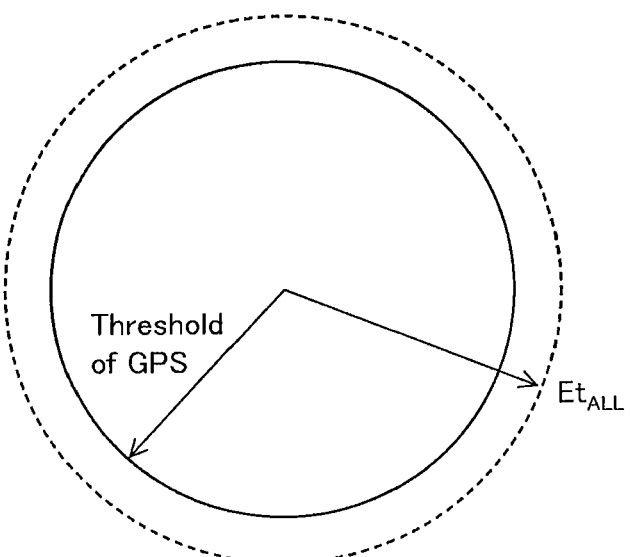
FIG. 8B shows a case in which positional data of a GPS is out of the range of a predetermined threshold value. The positional data of the GPS includes a difference between a photographing timing of an image and obtaining timing of the positional data of the GPS.

After the error in the positional data of the GPS is calculated, the positional data of the GPS, which includes the difference between the photographing timing of the image and the obtaining timing of the positional data of the GPS, is evaluated. FIG. 8A shows a case in which positional data of a GPS is in the range of a predetermined threshold value, and FIG. 8B shows a case in which positional data of a GPS is out of the range of a predetermined threshold value. In this case, the positional data of the GPS includes a difference between a photographing timing of an image and obtaining timing of the positional data of the GPS. As shown in FIG. 8A, if the positional data $Et_{ALL}$ of the GPS is in the range of the predetermined threshold value, the positional data of the GPS is selected. On the other hand, as shown in FIG. 8B, if the positional data $Et_{ALL}$ of the GPS is out of the range of the predetermined threshold value, the exterior orientation parameters (position of the camera) calculated from the image is selected.

Correction of the Posture of the Camera

The postural data obtained from the posture measuring unit 5 (an posture sensor or an IMU) is evaluated by using 2σ or 3σ of an assumable accuracy σ as an evaluation value (threshold value). The postural data includes an error based on the difference between the photographing timing of the image and the obtaining timing of the postural data of the posture sensor and the IMU. That is, if this postural data is out of the range of the threshold value, the posture of the camera calculated from the image is selected. On the other hand, if this postural data is in the range of the threshold value, the postural data of the posture measuring unit 5 is selected.

The postural data of the posture measuring unit 5 is made of three rotary angles (ω, φ, κ) of camera coordinate axes, and one of the rotary angles may be evaluated, or two or all three of the rotary angles may be evaluated. In this case, whether the rotary angles are used or not is set depending on the accuracy of the posture sensor and the IMU.

Figure 9A:
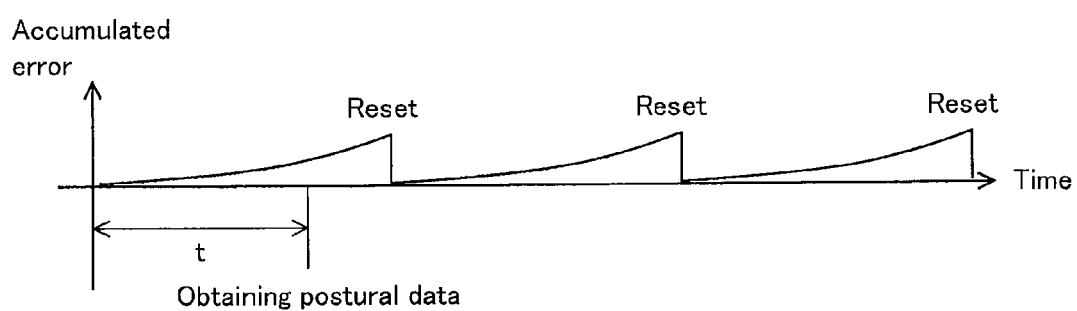
FIG. 9A shows a relationship between a measuring time of postural data of a posture measuring unit and an accumulated error.

A method for calculating an error in the posture sensor will be described hereinafter. FIG. 9A shows a relationship between a measuring time of postural data of a posture sensor and an accumulated error. Generally, in the postural data of the posture sensor, since acceleration may be integrated or double integrated essentially, error accumulates as time passes. It is assumed that a measuring time from setting of an initial value or from resetting of the hardware is represented as t, and an accumulated error is approximated to an exponential function of $1.05^t - 1$. In this case, errors Ext, Eyt, and Ezt of the postural data of the posture sensor are represented by the following thirteenth formula. For example, when t=10 seconds, Ext, Eyt, Ezt=0.63°. The accumulated error differs from the posture sensor, the IMU, and the measuring axis, and therefore, the approximate formula is formed respectively.

$$Ext = 1.05^t - 1$$

$$Eyt = 1.05^t - 1$$

$$Ezt = 1.05^t - 1 \qquad \text{Thirteenth Formula}$$

In the present invention, although the time of the posture sensor is not synchronized with the time of the camera, the obtaining time of the postural data and the photographing time of the image are converted to the reference time output from the reference clock 6. The converted time compensates the transmission delay of the postural data of the posture sensor and the transmission delay of the image data.

The frame rate of the moving image does not coincide with the obtaining rate of the postural data of the posture sensor, whereby the photographing timing of the image does not synchronized with the obtaining timing of the postural data of the posture sensor. Therefore, the error in the postural data of the posture sensor includes the error based on the difference between the photographing timing of the image and the obtaining timing of the postural data of the posture sensor.

Figure 9B:
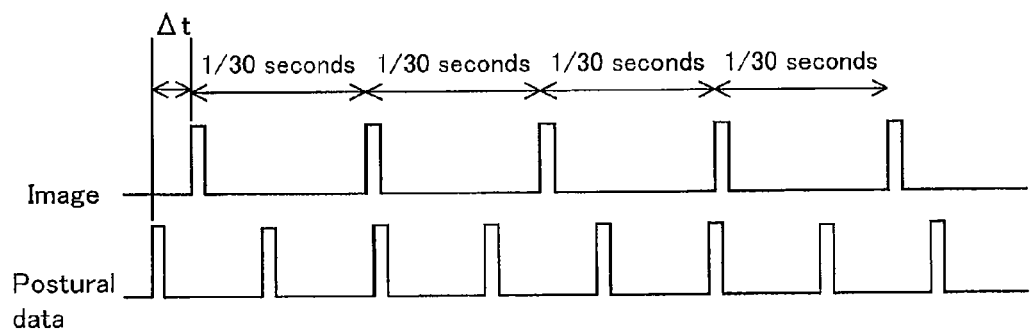
FIG. 9B is a timing chart in a case in which a photographing timing of an image is not synchronized with obtaining timing of postural data of a posture measuring unit.

FIG. 9B is a timing chart in a case in which a photographing timing of an image is not synchronized with obtaining timing of postural data of a posture sensor. As shown in FIG. 9B, it is assumed that the difference of the photographing timing of the image and the obtaining timing of the postural data of the posture sensor is represented as $\Delta t$, and the posture of the camera is changed at angle rates $v_x$, $v_y$, $v_z$ at that time. The errors Ext, Eyt, Ezt of the postural data of the posture sensor are represented by the following fourteenth formula.

$$Ext = 1.05^t - 1 + v_x \Delta t$$

$$Eyt = 1.05^t - 1 + v_y \Delta t$$

$$Ezt = 1.05^t - 1 + v_z \Delta t \qquad \text{Fourteenth Formula}$$

When the reference clock 6 is used, the photographing time of the image and the obtaining time of the postural data of the posture sensor are represented by the same time axis according to the reference clock 6. Therefore, time difference between the obtaining time of the postural data of the posture sensor and the photographing time of an image, which is photographed at a time nearest to the obtaining time, is represented as $\Delta t$. The value of $\Delta t$ shown in FIG. 9B is obtained by calculating a difference of the photographing time of the image and the obtaining time of the postural data of the posture sensor. For the angle rates $v_x$, $v_y$, $v_z$, values obtained from the posture sensor and the IMU are used. For example, when $v_x = 1.25°/\text{seconds}$, $v_y = 3.86°/\text{seconds}$, $v_z = 10.12°/\text{seconds}$, and $\Delta t = 1/120$ seconds, Ext=0.64°, Eyt=0.66°, and Ezt=0.71°.

Moreover, if a specific accuracy IMUe of the posture sensor is included, total errors $Ext_{ALL}$, $Eyt_{ALL}$, $Ezt_{ALL}$ of the postural data of the posture sensor are represented by the following fifteenth formula.

$$Ext_{ALL} = Ext + IMUe$$

$$Eyt_{ALL} = Eyt + IMUe$$

$$Ezt_{ALL} = Ezt + IMUe \qquad \text{Fifteenth Formula}$$

If the total errors $Ext_{ALL}$, $Eut_{ALL}$, $Ezt_{ALL}$ of the postural data of the posture sensor are out of the range of the predetermined threshold values, exterior orientation parameters (posture of the camera) calculated from the image are selected. If the total errors $Ext_{ALL}$, $Eyt_{ALL}$, $Ezt_{ALL}$ of the postural data of the posture sensor are in the range of the predetermined threshold values, the postural data of the posture sensor is selected.

(Step S12) Bundle Adjustment

After the exterior orientation parameters are corrected, a bundle adjustment is performed on the exterior orientation parameters and the three-dimensional coordinates of the characteristic points in one or more images, or all images at the same time. The bundle adjustment method uses a collinearity condition such that light fluxes (bundles) connecting a point in the objective space, a point in the image, and the projection center, must be on the same straight line. In the bundle adjustment, an observation equation is formed for each of the light flux in each image based on the collinearity condition, and simultaneous adjustment is performed by the least-squares method. The collinearity conditional formula is represented as the following sixteenth formula.

$$x = -c \frac{a_{11}(X - X_0) + a_{12}(Y - Y_0) + a_{13}(Z - Z_0)}{a_{31}(X - X_0) + a_{32}(Y - Y_0) + a_{33}(Z - Z_0)} + \Delta x$$

$$y = -c \frac{a_{21}(X - X_0) + a_{22}(Y - Y_0) + a_{23}(Z - Z_0)}{a_{31}(X - X_0) + a_{32}(Y - Y_0) + a_{33}(Z - Z_0)} + \Delta y \qquad \text{Sixteenth Formula}$$

$$\begin{pmatrix} x \\ y \\ z \end{pmatrix} = \begin{pmatrix} 1 & 0 & 0 \\ 0 & \cos\omega & -\sin\omega \\ 0 & \sin\omega & \cos\omega \end{pmatrix} \begin{pmatrix} \cos\phi & 0 & \sin\phi \\ 0 & 1 & 0 \\ -\sin\phi & 0 & \cos\phi \end{pmatrix} \qquad \text{Seventeenth Formula}$$

$$\begin{pmatrix} \cos\kappa & -\sin\kappa & 0 \\ \sin\kappa & \cos\kappa & 0 \\ 0 & 0 & 1 \end{pmatrix} \begin{pmatrix} X - X_0 \\ Y - Y_0 \\ Z - Z_0 \end{pmatrix}$$

$$= \begin{pmatrix} a11 & a12 & a13 \\ a21 & a22 & a23 \\ a31 & a32 & a33 \end{pmatrix} \begin{pmatrix} X - X_0 \\ Y - Y_0 \\ Z - Z_0 \end{pmatrix}$$

In the bundle adjustment, a successive approximation method is used. Specifically, approximate values of the three-dimensional coordinates of the reference point and the characteristic points, and approximate values of the exterior orientation parameters, are represented as (X', Y', Z') and ($X_0'$, $Y_0'$, $Z_0'$, $\omega'$, $\phi'$, $\kappa'$), respectively. Then, correction amounts are added to the approximate values, whereby (X'+$\Delta X$, Y'+$\Delta Y$, Z'+$\Delta Z$) and ($X_0'$+$\Delta X_0$, $Y_0'$+$\Delta Y_0$, $Z_0'$+$\Delta Z_0$, $\omega'$+$\Delta\omega$, $\phi'$+$\Delta\phi$, $\kappa'$+$\Delta\kappa$) are obtained. These approximate values including the correction amounts are used as true values of the three-dimensional coordinates of the reference point and the characteristic points and the exterior orientation parameters. Measured values of the image coordinates corresponding to the reference point and the characteristic points are represented as (x', y'). Then, errors are added to the measured values, whereby (x'+dx, y'+dy) are obtained and are used as true values of the image coordinates corresponding to the reference point and the characteristic points. The approximate values including the correction amounts and the measured values including the errors are substituted for the collinearity conditional formula (sixteenth formula) of one or more images. The sixteenth formula is expanded by using Taylor's formula about the approximate value and is linearized. Then, correction amounts are calculated by the least-squares method. The approximate values are corrected according to the calculated correction amounts, and the above calculations are repeated in the same manner, whereby convergence results are obtained.

In this case, the symbols Ax and Ay represent correction terms of the internal orientation parameters (focal point distance, principal point position, lens distortion coefficient). The following eighteenth formula represents a compensatory model of internal orientation parameters in a case in which a lens has distortion in a radiation direction. The internal orientation parameters are adjusted at the same time by using the eighteenth formula. That is, the bundle adjustment includes self calibration.

$$\Delta x = x_0 + x(k_1 r^2 + k_2 r^4)$$

$$\Delta y = y_0 + y(k_1 r^2 + k_2 r^4)$$

$$r^2 = (x^2 + y^2)/c^2$$

Eighteenth Formula c: Focal point distance x,y,z: Image coordinates
X,Y,Z: Objective space coodinates (reference point, unknown point)
$X_0, Y_0, Z_0$: Projection centers (photographing position of a camera)
$a_{11} \sim a_{33}$: Posture of a camera (parameters of 3×3 rotation matrix)
Δx, Δy: Correction terms of internal orientation of a camera
ω,φ,κ: Posture of a camera (angles of x,y,z axes rotated from X,Y,Z axes)
$k_1, k_2$: Lens distortion coefficients in radiation direction (Step S13) Calculation of the Three-Dimensional Coordinates of the Characteristic Points Based on the exterior orientation parameters which are bundle adjusted, three-dimensional coordinates of subsequently detected characteristic points are calculated. These characteristic points were detected in an area in which the density of the characteristic points was decreased. In this calculation, the forward intersection method or the DLT method may be used. As shown in FIG. 4, the calculation of the three-dimensional coordinates in the step S13 may be performed before the bundle adjustment (step S12).

Figure 10:
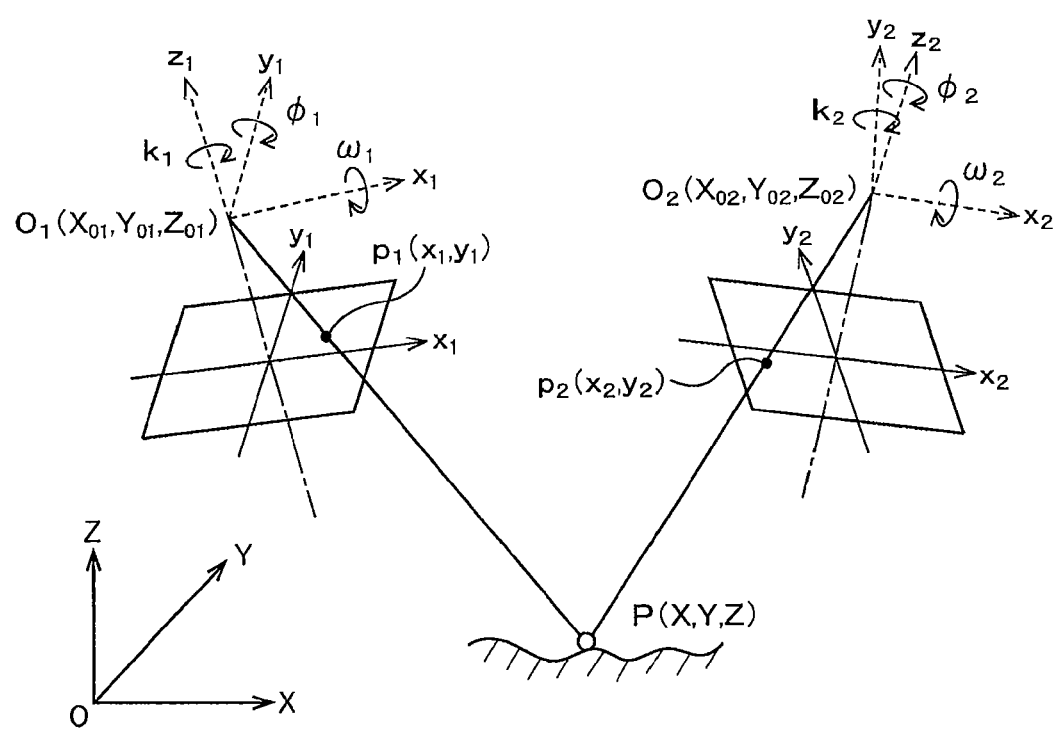
FIG. 10 is a schematic view for showing a forward intersection method.

FIG. 10 is an explanatory diagram for explaining a forward intersection method. In the forward intersection method, directions from at least two of known points ($O_1$, $O_2$) to an unknown point P are observed, and the position of the unknown point P is fixed as an intersection point of these directional lines.

As shown in FIG. 10, a coordinate system of an objective space is assumed to be O-XYZ. Coordinates ($X_{01}, Y_{01}, Z_{01}$) of a projection center $O_1$ of a camera and tilts ($\omega_1, \phi_1, \kappa_1$) of camera coordinate axes in a prior frame image, and coordinates ($X_{02}, Y_{02}, Z_{02}$) of a projection center $O_2$ the camera and tilts (posture) ($\omega_2, \phi_2, \kappa_2$) of camera coordinate axes in a current frame image, are known values. In addition, internal orientation parameters (focal point distance, principal point position, lens distortion coefficient) are also known values. If a point $p_1$ ($x_1, y_1$) in the prior frame image and a point $p_2$ ($x_2, y_2$) corresponding to the point $p_1$ in the current frame image are known, an unknown point P (X, Y, Z) in the objective space is fixed as an intersection point of a light ray ($O_1 p_1$) and a light ray ($O_2 p_2$). In this case, the two light rays do not intersect because there are essentially errors, and therefore, the intersection position is obtained by the least-squares method.

Specifically, a collinearity conditional formula (sixteenth formula) for the two light rays is formed, and the exterior orientation parameters, the internal orientation parameters, and the image coordinates of the corresponding point, all of which are known values, are substituted for the sixteenth formula. Moreover, approximate values including correction amounts of the unknown point P are substituted for the collinearity conditional formula. In this case, the approximate values of the unknown point P are represented as (X', Y', Z'), and the approximate values including the correction amounts are represented as (X'+ΔX, Y'+ΔY, Z'+ΔZ). The sixteenth formula is expanded by using Taylor's formula about the approximate value and is linearized. Then, the correction amounts are calculated by the least-squares method. The approximate values are corrected according to the calculated correction amounts, and the above calculations are repeated in the same manner, whereby convergence results are obtained. According to this step, the three-dimensional coordinates P (X, Y, Z) of the characteristic point is calculated.

(Step S14) Evaluation of Final Frame

After the three-dimensional coordinates of the subsequently detected characteristic points are calculated, whether the image which is currently processed is the final image or not is evaluated. When the image which is currently processed is not the final image, exterior orientation parameters of a following image are calculated by returning to the step S10. Then, the steps S10 to S14 are repeated until the image is evaluated as the final image. When the image which is currently processed is the final image, the process is finished.

Advantages of the First Embodiment

According to the first embodiment, the difference between the photographing timing of the image and the obtaining timing of the positional data of the position measuring unit 4 or the postural data of the posture measuring unit 5, is used as an error of the positional data of the position measuring unit 4 or the postural data of the posture measuring unit 5. The positional data of the position measuring unit 4 and the postural data of the posture measuring unit 5 include this difference. The exterior orientation parameters are corrected depending on whether this positional data and this postural data are in the range of predetermined threshold values or not. Even when the photographing timing of the image do not synchronize with the obtaining timing of the positional data of the position measuring unit 4 and the postural data of the posture measuring unit 5, the exterior orientation parameters are appropriately corrected. Therefore, the errors are decreased.

In the errors of the positional data of the position measuring unit 4 and the postural data of the posture measuring unit 5, specific accuracy in the positional data and the postural data is added to the error based on the time difference Δt. Therefore, the exterior orientation parameters calculated from the image are appropriately corrected.

Specifically, in the case of RTK-GPS (Real Time Kinematic GPS), the positioning mode is changed in real time based on a position of a GPS satellite, multipath affected by surrounding environment, correction information from a control station, and the like, which may affect the accuracy. Accordingly, by changing the threshold value for correcting the exterior orientation parameters based on the positioning mode, the exterior orientation parameters are appropriately corrected.

On the other hand, in the postural data of the posture measuring unit 5, the error tends to accumulate due to the function of the measurement and the measuring time t. Therefore, by including the accuracy based on the measuring time t of the postural data, the exterior orientation parameters are appropriately corrected.

2. Second Embodiment

A modification of the first embodiment will be described hereinafter. In the second embodiment, change of photographing scenes and shift of a photographing unit are evaluated based on at least one selected from the group consisting of directions and distances of tracks of the characteristic points, a distribution rate of the characteristic points, an overlapping rate, and a vertical parallax.

Structure of the Position Measurement Device

Figure 11:
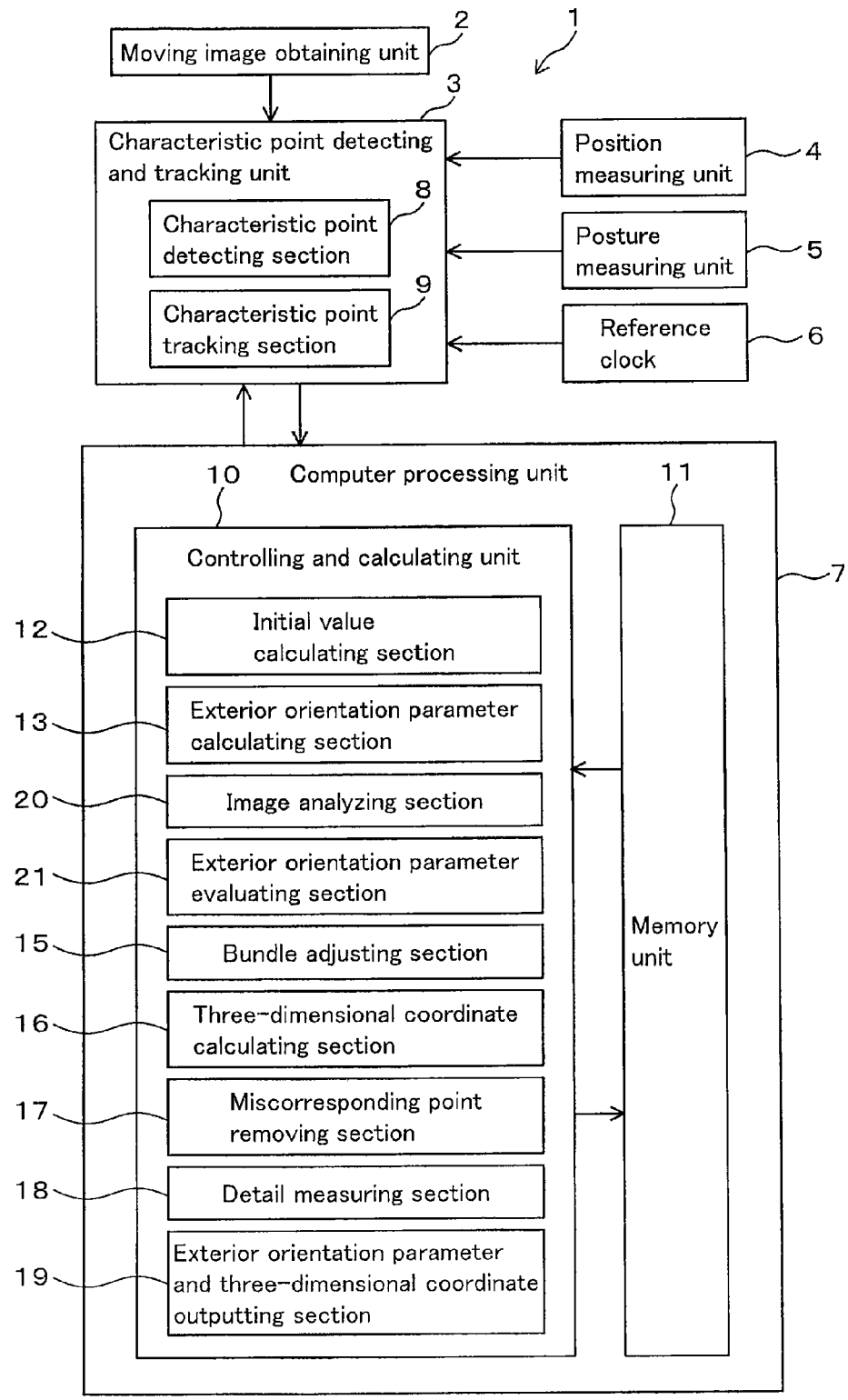
FIG. 11 is a functional block diagram of a position measurement device.

FIG. 11 is a functional block diagram of a position measurement device. The position measurement program further includes an image analyzing section 20 compared to the position measurement program shown in FIG. 2. Moreover, the position measurement program includes an exterior orientation parameter evaluating section 21 instead of the exterior orientation parameter correcting section 14 in FIG. 2.

In the image analyzing section 20, change of photographing scenes and shift of a photographing unit are analyzed based on track directions of the characteristic points, moved distances of the characteristic points, a distribution rate of the characteristic points, an overlapping rate, and a vertical parallax.

In the exterior orientation parameter evaluating section 21, the exterior orientation parameters calculated from the image are evaluated based on the analyzed result of the image analyzing section 20. When the change of the photographing scenes is evaluated to be relatively great, the exterior orientation parameters are corrected by using the positional data obtained from the position measuring unit 4 and the postural data obtained from the posture measuring unit 5. When the change of the photographing scenes is evaluated to be relatively small, the exterior orientation parameters calculated from the image is selected.

Operation of the Position Measurement Device

Figure 12:
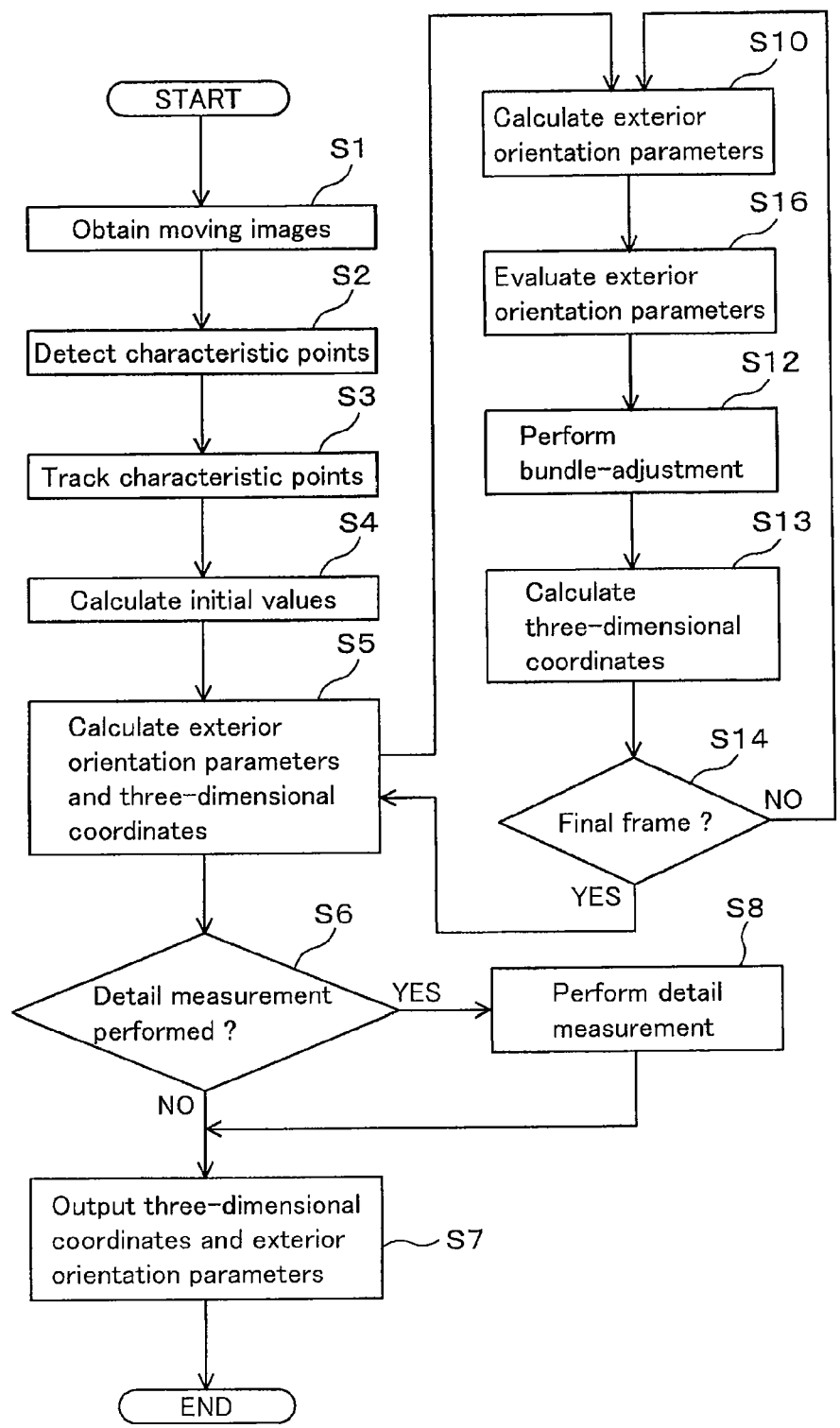
FIG. 12 is a flow chart showing a process of a position measurement device.
Figure 13:
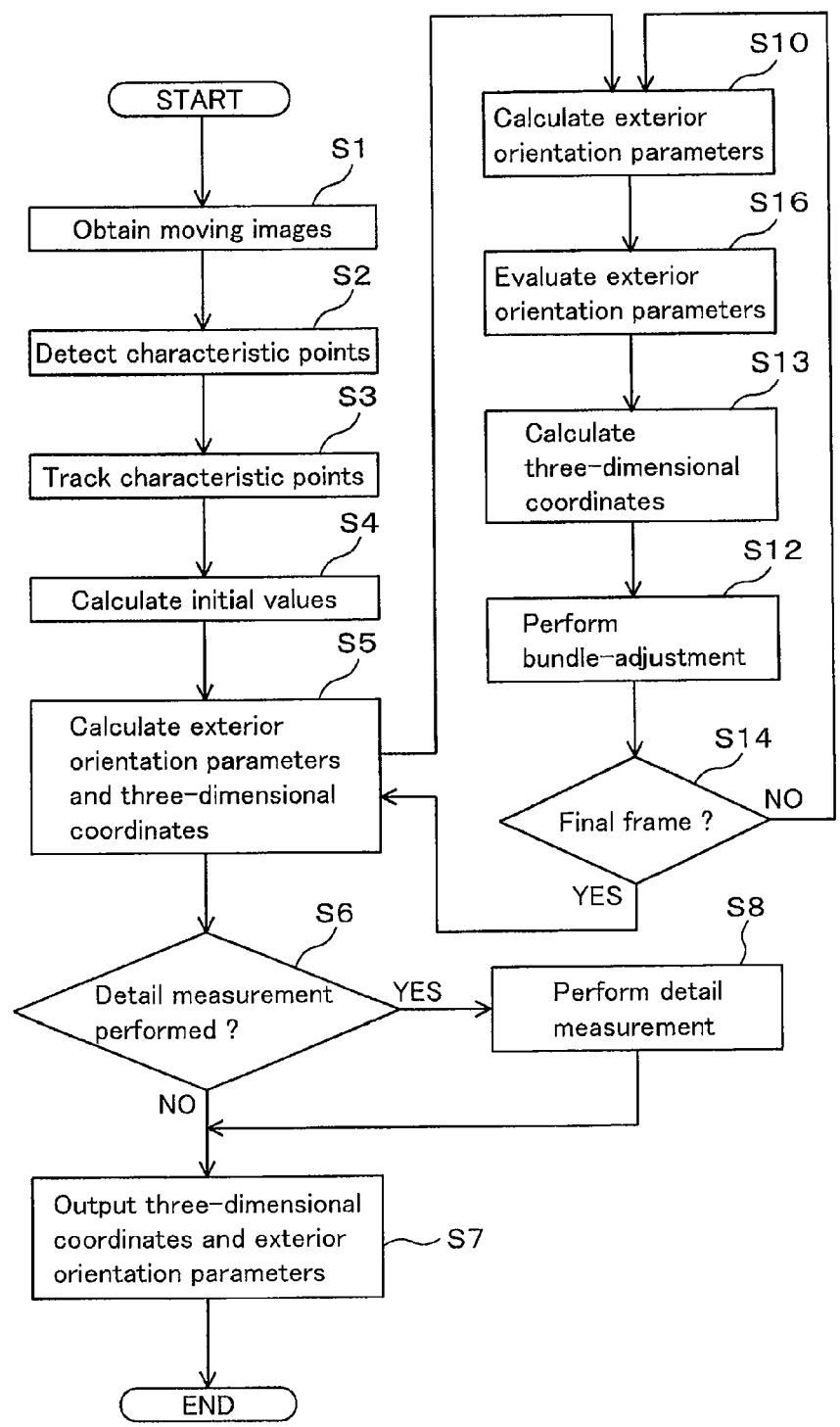
FIG. 13 is a flow chart showing a process of a position measurement device.

Next, overall operation of the position measurement device will be described. FIGS. 12 and 13 are flow charts showing operations of the position measurement device.

A process of calculating three-dimensional coordinates and exterior orientation parameters in the step S5 related to the second embodiment will be described in detail hereinafter. As shown in FIG. 12, the process of calculating the three-dimensional coordinates and the exterior orientation parameters in the step S5 includes a step of calculation of the exterior orientation parameters (step S10), a step of evaluation of the calculated exterior orientation parameters (step S16), a step of bundle adjustment of the evaluated exterior orientation parameters and the three-dimensional coordinates of known points (step S12), and a step of calculation of three-dimensional coordinates of subsequently detected characteristic points (step S13).

The bundle adjustment (step S12) may be performed before the calculation of the three-dimensional coordinates of the subsequently detected characteristic points (FIG. 12) or after the calculation of the three-dimensional coordinates of the subsequently detected characteristic points (FIG. 13). In the case shown in FIG. 12, the calculation accuracy of the three-dimensional coordinates of the subsequently detected characteristic points is improved. In the case shown in FIG. 13, since the three-dimensional coordinates of the subsequently detected characteristic points are calculated based on the evaluated exterior orientation parameters, the function is the same as the function in the case shown in FIG. 12.

(Step S16) Evaluation of the Exterior Orientation Parameters

The calculation of the exterior orientation parameters is based on the three-dimensional coordinates of the reference point or the characteristic points in which the three-dimensional coordinates are previously calculated, and is also based on the image coordinates obtained by tracking the characteristic points. Therefore, the accuracy of the exterior orientation parameters depends on the tracking accuracy of the characteristic points. The tracking accuracy of the characteristic points depends on remarkable change of the photographing scenes and shift of the photographing unit. Therefore, depending on change of the photographing scenes and shift of the photographing unit, errors may occur or calculations may not be performable.

Accordingly, when change of the photographing scenes and shift of the photographing unit are great, and the exterior orientation parameters calculated from the image are not reliable, positional data obtained from the position measuring unit 4 and postural data obtained from the posture measuring unit 5 are used. In this case, the exterior orientation parameters calculated from the image are not used.

The amount of the change of the photographing scenes and the amount of the shift of the photographing unit are evaluated based on directions and distances of tracks of the characteristic points, a distribution rate of the characteristic points, an overlapping rate, and a vertical parallax. This evaluation is performed by the image analyzing section 20. A method for evaluating the change of the photographing scenes will be described hereinafter.

Figure 14A:
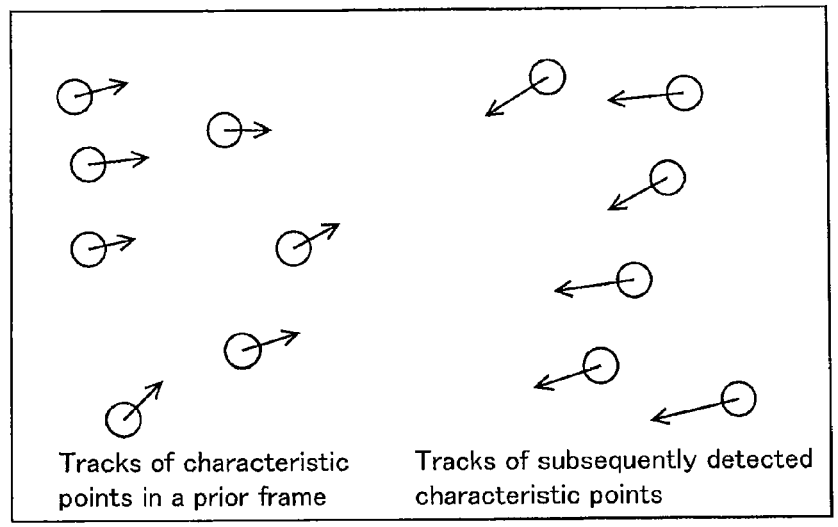
FIG. 14A shows an image in which track directions of characteristic points in a prior frame and track directions of subsequently detected characteristic points are different.
Figure 14B:
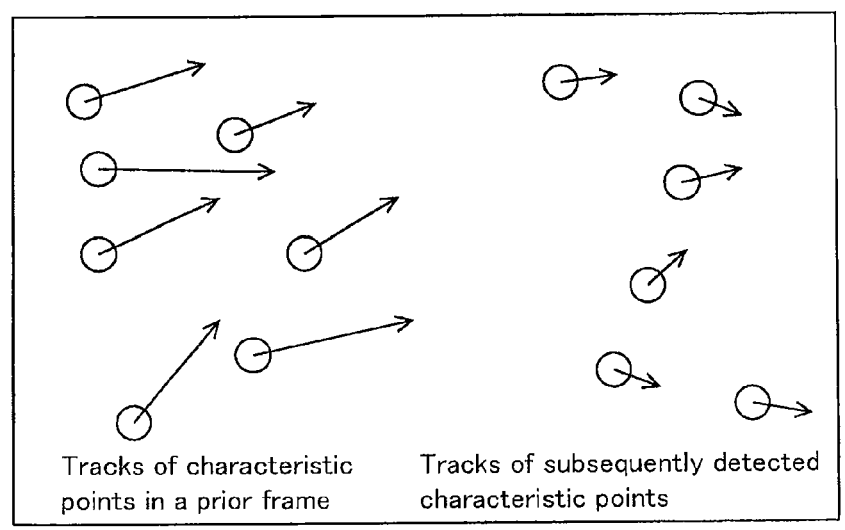
FIG. 14B shows an image in which track distances of characteristic points in a prior frame and track distances of subsequently detected characteristic points are different.

Evaluation According to Directions and Distances of tracks of the Characteristic Points FIG. 14A shows an image in which track directions of characteristic points in a prior frame and track directions of subsequently detected characteristic points are different, and FIG. 14B shows an image in which track distances of characteristic points in a prior frame and track distances of subsequently detected characteristic points are different.

For example, as shown in FIG. 14A, when a camera is shifted to the right direction, characteristic points are subsequently detected and are increased in an area in which the density of the characteristic points is decreased. When the track directions of the subsequently detected characteristic points are greatly changed by 90 degrees, 180 degrees, and so on, with respect to the track directions of the prior characteristic points, the photographing scene is evaluated to be changed, or the photographing unit is evaluated to be shifted. In this case, the exterior orientation parameters calculated from the image are evaluated to have low reliability. Then, the exterior orientation parameters are corrected by using the positional data obtained from the position measuring section 4 and the postural data obtained from the posture measuring unit 5.

The change of the track direction of the characteristic point is defined as an angle $\theta$ between a track vector "a" of a characteristic point in a prior frame and a track vector "b" of a subsequently detected characteristic point. This angle is calculated from a definition of the inner product represented by a nineteenth formula.

$$\cos\theta = \frac{\langle a, b \rangle}{|a| \cdot |b|} = \frac{(x_1 - x_0)(x_2 - x_1) + (y_1 - y_0)(y_2 - y_1)}{\sqrt{(x_1 - x_0)^2 + (y_1 - y_0)^2} \sqrt{(x_2 - x_1)^2 + (y_2 - y_1)^2}}$$

Nineteenth Formula

Furthermore, for example, as shown in FIG. 14B, when tracking distances of the subsequently detected characteristic points are greatly changed by double, quadruple, etc., with respect to the prior tracking distances, the photographing scene is evaluated to be changed. In this case, the exterior orientation parameters calculated from the image are evaluated to have low reliability. Then, the exterior orientation parameters are corrected by using the positional data obtained from the position measuring unit 4 and the postural data obtained from the posture measuring unit 5.

The change of the tracking distance is the difference between the length of the track vector "a" of the characteristic point in the prior frame and the length of the track vector "b" of the subsequently detected characteristic point. This difference is calculated from the following twentieth formula. Threshold values for directions and distances of the tracks of the characteristic points are adjustable.

$$\|a\| - \|b\| = \left| \sqrt{(x_1 - x_0)^2 + (y_1 - y_0)^2} - \sqrt{(x_2 - x_1)^2 + (y_2 - y_1)^2} \right| \quad \text{Twentieth Formula}$$

Figure 15A:
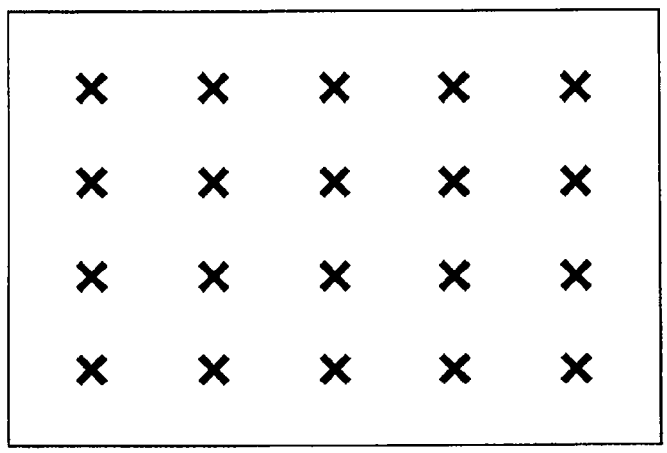
FIG. 15A shows an image in which a distribution rate of characteristic points is zero.
Figure 15B:
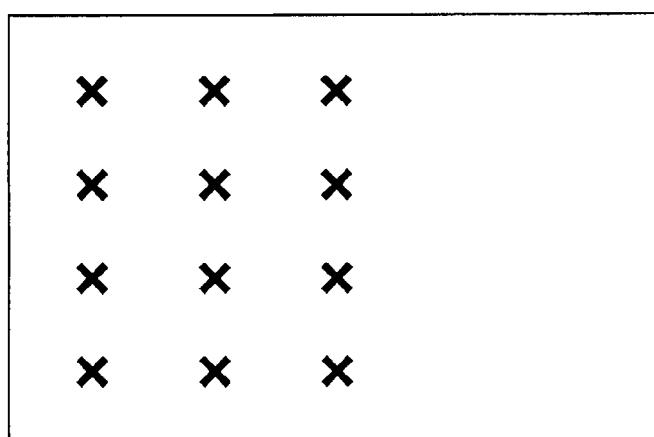
FIG. 15B shows an image in which a distribution rate of characteristic points is negative.
Figure 15C:
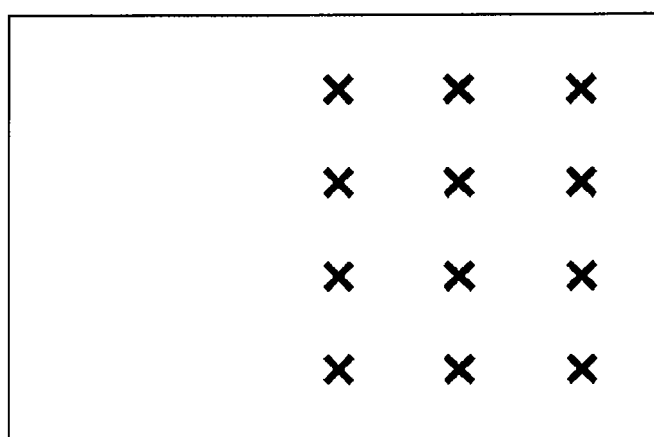
FIG. 15C shows an image in which a distribution rate of characteristic points is positive.

Evaluation According to the Distribution Rate of the Characteristic Points and the Overlapping Rate When the change of the photographing scene and the shift of the photographing unit are great, there may be cases in which the characteristic points cannot be tracked, and the points are partially distributed in an image. FIG. 15A shows an image in which a distribution rate of the characteristic points is zero, FIG. 15B shows an image in which a distribution rate of the characteristic points is negative, and FIG. 15C shows an image in which a distribution rate of the characteristic points is positive.

When the camera is shifted in a horizontal direction, a distribution rate of the characteristic points in the horizontal direction is calculated as a total value of X coordinates of the characteristic points. In this case, the center of the image is assumed to be origin (0, 0). For example, in the case shown in FIG. 15A, since the characteristic points are uniformly distributed in the overall image, the total value of the X coordinates comes to zero. In the case shown in FIG. 15B, since the characteristic points are distributed on the left side of the image, the total value of the X coordinates comes to negative. In the case shown in FIG. 15C, since the characteristic points are distributed on the right side of the image, the total value of the X coordinates comes to positive.

When the camera is shifted in a vertical direction, the distribution rate of the characteristic points in the vertical direction is calculated as a total value of Y coordinates of the characteristic points. In this case, the center of the image is assumed to be origin (0, 0). Therefore, the distribution rate of the characteristic points in the vertical direction may be calculated from the total value of the Y coordinates of the characteristic points.

Figure 16A:
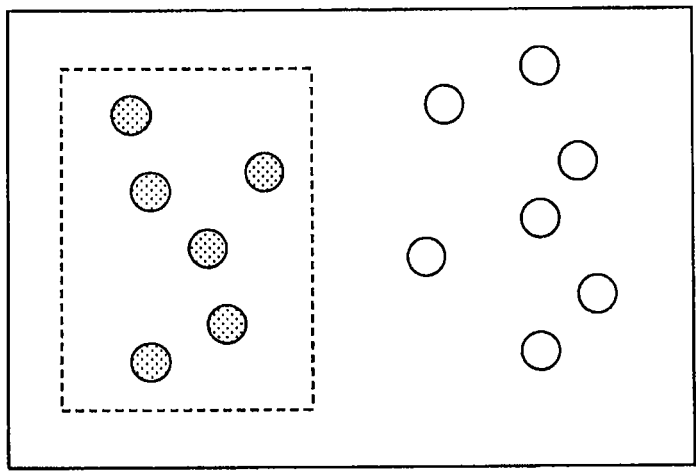
FIG. 16A shows an image in which characteristic points overlapping in a prior frame and a subsequent frame are partially distributed.
Figure 16B:
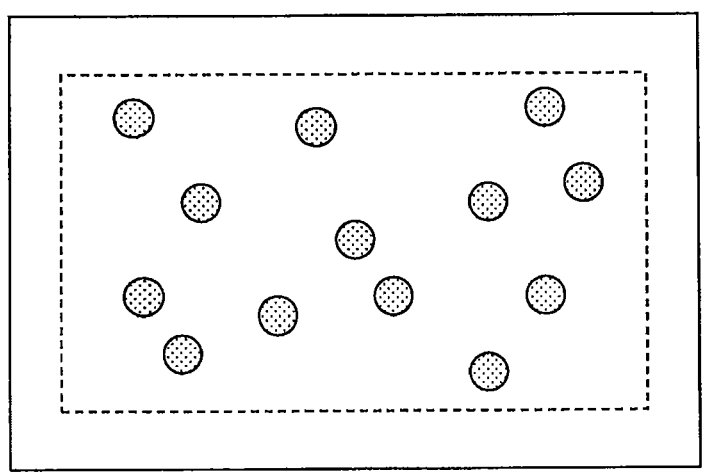
FIG. 16B shows an image in which characteristic points overlapping in a prior frame and a subsequent frame are not partially distributed.

When the change of the photographing scene and the shift of the photographing unit are great, there may be cases in which characteristic points overlapping in the prior and the subsequent frames are partially distributed. These overlapping characteristic points are points obtained by tracking the characteristic points. FIG. 16A shows an image in which characteristic points overlapping in prior and subsequent frames are partially distributed, and FIG. 16B shows an image in which characteristic points overlapping in prior and subsequent frames are not partially distributed.

As shown in FIG. 16A, when the overlapping characteristic points are partially distributed, the exterior orientation parameters calculated from the image are evaluated to have low reliability. In this case, the exterior orientation parameters are corrected by using the positional data obtained from the position measuring unit 4 and the postural data obtained from the position measuring unit 5. As shown in FIG. 16B, when the overlapping characteristic points are not partially distributed, the exterior orientation parameters calculated from the image are evaluated to have high reliability. In this case, the exterior orientation parameters calculated from the image are used.

The distribution condition (overlapping rate) of the overlapping characteristic points is evaluated by the method for calculating the distribution rate of the characteristic points. Threshold values for the distribution rate of the characteristic points and the overlapping rate are adjustable.

Evaluation According to the Vertical Parallax

The vertical parallax is a difference between y coordinates of corresponding points in two images that are stereographed. That is, the vertical parallax is a difference of coordinate values in a direction intersecting the baseline direction of the stereo images at a right angle. The stereo images are a pair of images and are made of two images photographed by cameras in a condition in which the optical axes are parallel, and directions intersecting a baseline direction at a right angle are parallel. Therefore, the y coordinates of the corresponding points in the two images are equal, whereby the vertical parallax in the stereo images is usually zero pixel.

If the photographing unit is shifted, the vertical parallax does not come to zero pixel. Therefore, when there is not less than 1 pixel of the vertical parallax, the exterior orientation parameters calculated from the image are not used, and the positional data obtained from the position measuring unit 4 and the postural data obtained from the posture measuring unit 5 are used.

The vertical parallax is obtained by calculating the difference between the y coordinate of the characteristic point in a prior frame and the y coordinate of the characteristic point in a current frame. A threshold value for the vertical parallax is adjustable.

The change of the photographing scene and the shift of the photographing unit may be evaluated based on the value obtained by multiplying more than one or all of the parameters selected from the group consisting of the directions and the distances of the tracks of the characteristic points, the distribution rate of the characteristic points, the overlapping rate, and the vertical parallax.

Advantages of the Second Embodiment

According to the second embodiment, the change of the photographing scene and the shift of the photographing unit are evaluated based on at least one selected from the group consisting of the directions and the distances of the tracks of the characteristic points, the distribution rate of the characteristic points, the overlapping rate, and the vertical parallax. The change of the photographing scene and the shift of the photographing unit cause difficulty in tracking of the characteristic points and cause decrease in the accuracy of the exterior orientation parameters calculated from the images. Therefore, when the change of the photographing scene and the shift of the photographing unit are relatively great, the exterior orientation parameters calculated from the images are evaluated to have low reliability. On the other hand, when the change of the photographing scene and the shift of the photographing unit are relatively small, the exterior orientation parameters calculated from the images are evaluated to have high reliability.

When the exterior orientation parameters calculated from the images are evaluated to have low reliability, the positional data obtained from the position measuring unit 4 and the postural data obtained from the posture measuring unit 5 are used whereas the exterior orientation parameters calculated from the images are not used. According to this embodiment, errors due to the change of the photographing scene and the shift of the photographing unit are decreased.

3. Third Embodiment

A modification of the first and the second embodiments will be described hereinafter. In the third embodiment, a weighted bundle adjustment is performed.

Figure 17A:
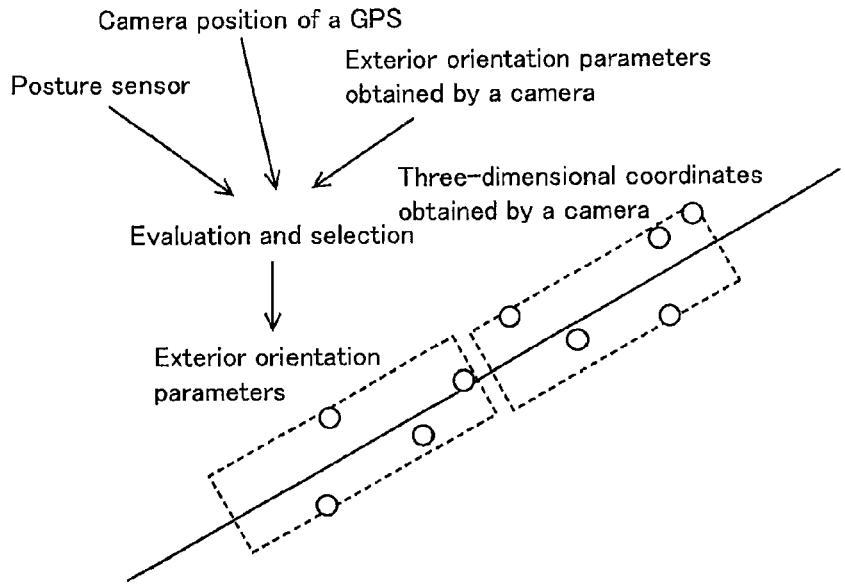
FIG. 17A is a schematic view showing a bundle adjustment related to the first and the second embodiments.

FIG. 17A is a schematic view showing a bundle adjustment related to the first and the second embodiments. As shown in FIG. 17A, in the first embodiment, the exterior orientation parameters calculated from the camera are corrected based on the error caused by the time difference $\Delta t$ of the positional data of the GPS or the postural data of the posture sensor. In the second embodiment, the exterior orientation parameters calculated from the camera are evaluated based on at least one selected from the group consisting of the directions and the distances of the tracks of the characteristic points, the distribution rate of the characteristic points, the overlapping rate, and the vertical parallax. Then, best data are selected from the group consisting of the positional data of the GPS, the postural data of the posture sensor, and the exterior orientation parameters calculated from the camera, for the exterior orientation parameters to be bundle adjusted. The bundle adjustment is performed based on these selected exterior orientation parameters. Therefore, the bundle adjustment is performed based on the data shown in a dotted frame area in FIG. 17A.

Figure 17B:
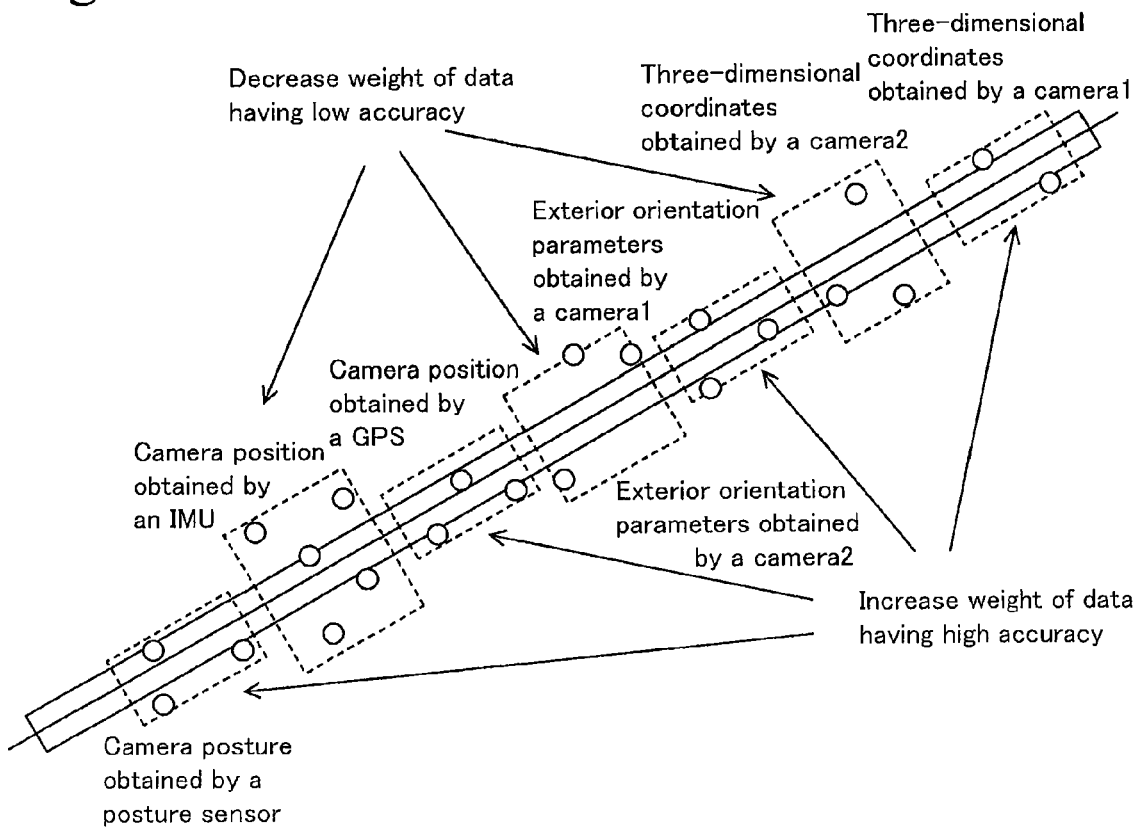
FIG. 17B is a schematic view showing a weighted bundle adjustment related to the third embodiment.

On the other hand, in the third embodiment, the exterior orientation parameters are not corrected by using best data, but the positional data of the GPS, the postural data of the posture sensor, and the exterior orientation parameters calculated from the camera, are weighted and are bundle adjusted. FIG. 17B is a schematic view showing a weighted bundle adjustment related to the third embodiment. As shown in FIG. 17B, weights of data having low accuracy are decreased, and weights of data having high accuracy are increased. As a result, the exterior orientation parameters and the three-dimensional coordinates of the characteristic points are bundle adjusted so as to be in the area of the solid lined frame shown in FIG. 17B.

The weight is calculated based on the accuracy of each data. If the accuracy of each data is represented as u, the weight w is calculated from a twenty-first formula. The accuracy of each data will be described hereinafter.

$$w=1/\sigma^2 \quad \text{Twenty-first Formula}$$

Accuracy of the Positional Data of the GPS and the Postural Data of the Posture Sensor The accuracy of the positional data of the GPS and the postural data of the posture sensor are based on an error caused by the difference between the photographing timing of the image and the obtaining timing of the positional data of the GPS or the postural data of the posture sensor, and are also based on specific accuracy of the positional data of the GPS and the postural data of the posture sensor.

Generally, the times of the GPS and the posture sensor are not synchronized with the time of the camera. Therefore, in the present invention, the obtaining time of the positional data of the GPS and the photographing time of the image are converted to the reference time outputted from the reference clock 6. The converted times include the transmission delay of the positional data and the postural data and the transmission delay of the image data.

The frame rate of the moving image do not coincide with the obtaining rate of the GPS and the posture sensor, whereby the photographing timing of the image do not synchronize with the obtaining timing of the positional data of the GPS and the postural data of the posture sensor. Therefore, the accuracy of the GPS and the posture sensor include an error based on the difference between the photographing timing of the image and the obtaining timing of the positional data of the GPS or the postural data of the posture sensor.

It is assumed that the difference of the photographing timing of the image and the obtaining timing of the positional data of the GPS or the postural data of the posture sensor is represented as $\Delta t$. When the camera moves at a rate v (angle rate $v_x$, $v_y$, $v_z$), an error Et of the positional data of the GPS is represented as a twenty-second formula, and errors Ext, Eyt, Ezt of the postural data of the posture sensor are represented as a twenty-third formula.

$$Et=v\Delta t \quad \text{Twenty-second Formula}$$

$$Ext=v_x\Delta t$$

$$Eyt=v_y\Delta t$$

$$Ezt=v_z\Delta t \quad \text{Twenty-third Formula}$$

The photographing time of the image and the obtaining time of the positional data of the GPS and the postural data of the posture sensor are represented by the same time axis according to the reference clock 6. Therefore, time difference between the obtaining time of the positional data of the GPS and the postural data of the posture sensor and the photographing time of an image, which is photographed at a time nearest to the obtaining time, is represented as $\Delta t$.

The rate v is calculated from a moving distance of the characteristic point in the moving image and the frame rate of the moving image. For the angle rate $v_x$, $v_y$, $v_z$, values obtained from the posture sensor and the IMU are used.

$$v=(X_i-X_{i-1})\times\text{fps} \quad \text{Twenty-fourth Formula}$$

$X_i$: Position coordinate of the characteristic point in i frame
$X_{i-1}$: Position coordinate of the characteristic point in i-1 frame
fps: Frame rate (frame/sec)

Next, specific accuracy of the GPS and the posture sensor will be described. The positioning accuracy of the GPS varies depending on values of the satellite position (DOP: Dilution of Precision), the multipath, the link quality (LQ), the convergence estimation of positioning calculation, and the like. For example, in the case of the RTK-GPS (Real Time Kinematic GPS) system, the positioning mode is changed in real time as shown in the Table 1, according to the position of the GPS satellite, the effects of multipath affected by surrounding environment, the correction information from a control station, etc.

If the positioning accuracy of the GPS is represented as $GPS_{rtke}$, a total error $Et_{ALL}$ of the positional data of the GPS is represented as a twenty-fifth formula.

$$Et_{ALL}=Et+GPS_{rtke} \quad \text{Twenty-fifth Formula}$$

In the posture sensor, since acceleration may be integrated or be double integrated essentially, error accumulates as time passes. It is assumed that the measuring time from setting of the initial value or from resetting of the hardware is represented as t, and the accumulated error is approximated to an exponential function of $1.05^t-1$. In this case, the accuracy of the posture sensor is represented by a twenty-sixth formula. Moreover, if the specific accuracy IMUe of the posture sensor is included in the twenty-sixth formula, the total values $Ext_{ALL}$, $Eyt_{ALL}$, $Ezt_{ALL}$ of the accuracy of the posture sensor are represented by a twenty-seventh formula.

$$Ext=1.05^t-1+v_x\Delta t$$

$$Eyt=1.05^t-1+v_y\Delta t$$

$$Ezt=1.05^t-1+v_z\Delta t \quad \text{Twenty-sixth Formula}$$

$$Ext_{ALL}=Ext+\text{IMUe}$$

$$Eyt_{ALL}=Eyt+\text{IMUe}$$

$$Ezt_{ALL}=Ezt+\text{IMUe} \quad \text{Twenty-seventh Formula}$$

Accuracy of the Exterior Orientation Parameters and the Three-dimensional Coordinates of the Characteristic Points The accuracy of the exterior orientation parameters and the three-dimensional coordinates of the characteristic points are obtained based on at least one selected from the group consisting of the directions and the distances of the tracks of the characteristic points, the distribution rate of the characteristic points, the overlapping rate, and the vertical parallax, in the second embodiment. The change of the track direction of the characteristic point is represented as an angle θ between a vector "a" and a vector "b" (tenth formula), and the change of the track distance of the characteristic point is represented as a difference |a−b| of the vector "a" and the vector "b" (eleventh formula). Therefore, the accuracy σ is represented as θ or |a−b|.

The distribution rate of the characteristic points and the overlapping rate are the total values of the X coordinates and the Y coordinates of the characteristic points which have an origin at the center of the image. Therefore, the accuracy σ is represented by an absolute value of the distribution rate or the overlapping rate. Since the vertical parallax is the difference between the y coordinates of the characteristic points in the stereo images, the accuracy σ is represented by an absolute value of the difference between the y coordinates of the characteristic points.

The accuracy c of the exterior orientation parameters and the three-dimensional coordinates of the characteristic points may be represented by a value obtained by multiplying more than one or all of the parameters selected from the group consisting of the directions and the distances of the tracks of the characteristic points, the distribution rate of the characteristic points, the overlapping rate, and the vertical parallax.

Weighted Bundle Adjustment

Each correction amount in the weighted bundle adjustment is calculated as a value for minimizing the following function G. For example, the symbol "$w_2$" represents a weight of the three-dimensional coordinates obtained by the camera, and the symbols "$w_3$" and "$w_4$" represent weights of the exterior orientation parameters.

$$G=[w_1(\Delta x_i^2+\Delta y_i^2)]+[w_2(\Delta X_i^2+\Delta Y_i^2+\Delta Z_i^2)]+ \\ [w_3(\Delta\omega_i^2+\Delta\phi_i^2+\Delta\kappa_i^2)]+[w_4(\Delta X_0^2+\Delta Y_0^2+\Delta Z_0^2)]$$ Twenty-eighth Formula

[ ]: Summation symbol of Gauss
$w_1$: Weight of measured values of image coordinates
$w_2$: Weight of coordinates of a reference point
$w_3$: Weight of measured values of angles
$w_4$: Weight of coordinates of a photographing point When the positional data of the GPS and the IMU and the postural data of the posture sensor are included, the following twenty-ninth formula is used and is minimized. For example, the symbol "$w_5$" represents a weight of the positional data of the GPS, the symbol "$w_6$" represents a weight of the positional data of the IMU, and the symbol "$w_7$" represents a weight of the postural data of the posture sensor.

$$G = [w_1(\Delta x_i^2 + \Delta y_i^2)] + [w_2(\Delta X_i^2 + \Delta Y_i^2 + \Delta Z_i^2)] + \\ [w_3(\Delta\omega_i^2 + \Delta\phi_i^2 + \Delta\kappa_i^2)] + \\ [w_4(\Delta X_0^2 + \Delta Y_0^2 + \Delta Z_0^2)] + \\ [w_5(\Delta X_{IMU0}^2 + \Delta Y_{IMU0}^2 + \Delta Z_{IMU0}^2)] + \\ [w_6(\Delta X_{c20}^2 + \Delta Y_{c20}^2 + \Delta Z_{c20}^2)] + \\ [w_7(\Delta\omega_{c2i}^2 + \Delta\phi_{c2i}^2 + \Delta\kappa_{c2i}^2)]$$ Twenty-ninth Formula Advantages of the Third Embodiment According to the third embodiment, the exterior orientation parameters and the three-dimensional coordinates of the characteristic points, and also the positional data of the position measuring unit 4 and the postural data of the posture measuring unit 5, are bundle adjusted at the same time. In this case, each data is weighted and is bundle adjusted, whereby the weights of data having low accuracy are decreased, and the weights of data having high accuracy are increased. Accordingly, the errors of the exterior orientation parameters and the three-dimensional coordinates of the characteristic points are decreased.

The weights of the positional data of the position measuring unit 4 and the postural data of the posture measuring unit 5 are calculated based on the difference between the photographing timing of the image and the obtaining timing of the positional data of the position measuring unit 4 or the postural data of the posture measuring unit 5. Therefore, even when the photographing timing of the image do not synchronize with the obtaining timing of the positional data of the position measuring unit 4 and the postural data of the posture measuring unit 5, the errors of the exterior orientation parameters and the three-dimensional coordinates of the characteristic points are decreased.

The weights of the exterior orientation parameters and the three-dimensional coordinates of the characteristic points are calculated based on at least one selected from the group consisting of the directions and the distances of the tracks of the characteristic points, the distribution rate of the characteristic points, the overlapping rate, and the vertical parallax. The accuracy of the exterior orientation parameters and the three-dimensional coordinates of the characteristic points calculated from the image have strong tendency to depend on the change of the photographing scene and the shift of the photographing unit. The directions and the distances of the tracks of the characteristic points, the distribution rate of the characteristic points, the overlapping rate, and the vertical parallax, are reference for evaluating the change of the photographing scene and the shift of the photographing unit. Therefore, by using these parameters for the weights of exterior orientation parameters and the three-dimensional coordinates of the characteristic points, the errors of the exterior orientation parameters and the three-dimensional coordinates of the characteristic points are decreased.

4. Fourth Embodiment

A modification of the first to the third embodiments will be described hereinafter. In the fourth embodiment, by removing points having relatively large errors (miscorresponding points) from the corresponding points which are tracked, calculation accuracy of the exterior orientation parameters and the three-dimensional coordinates of the characteristic points are improved.

Figure 18:
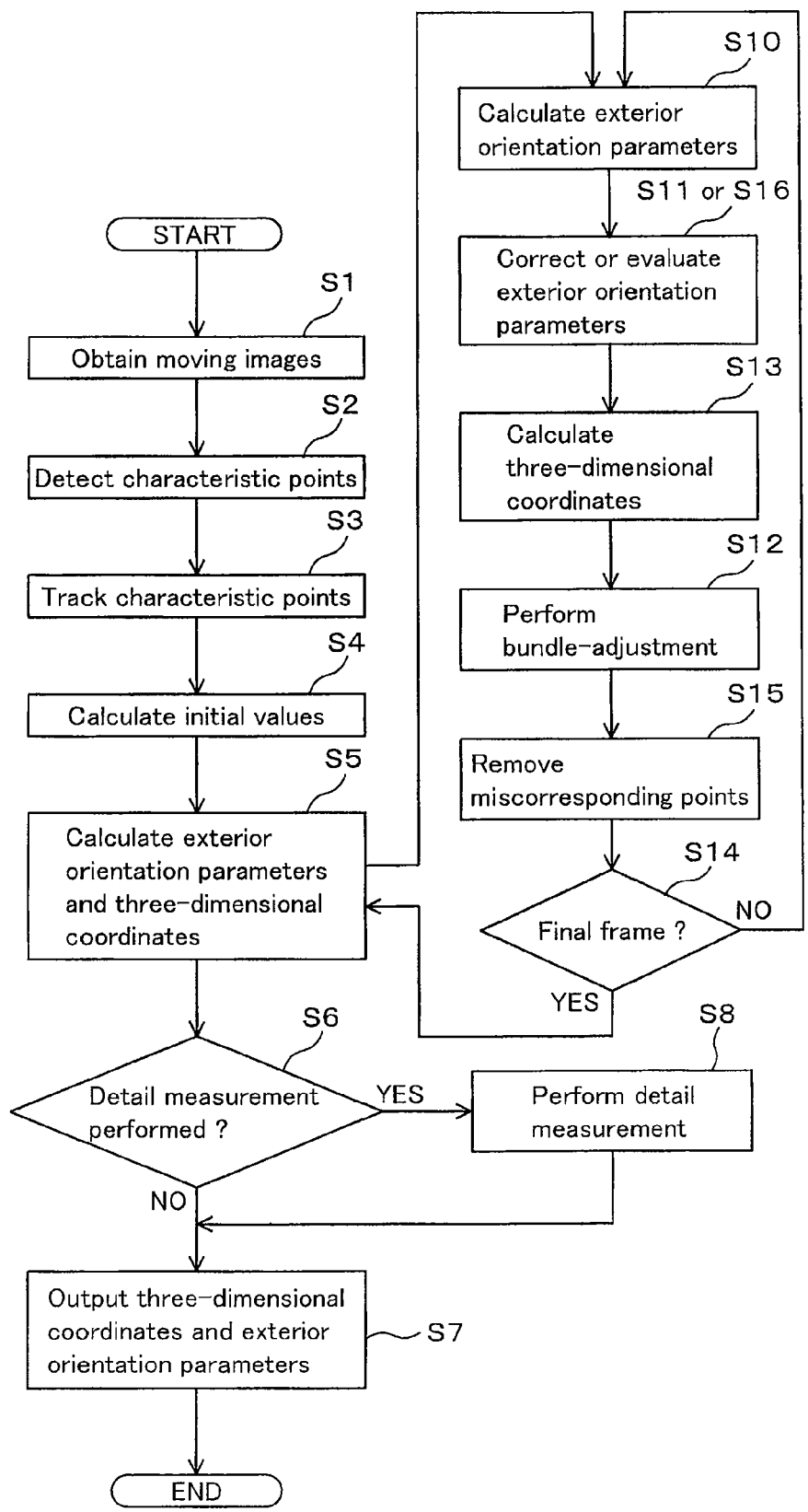
FIG. 18 is a flow chart including a step of removing miscorresponding points.
Figure 19:
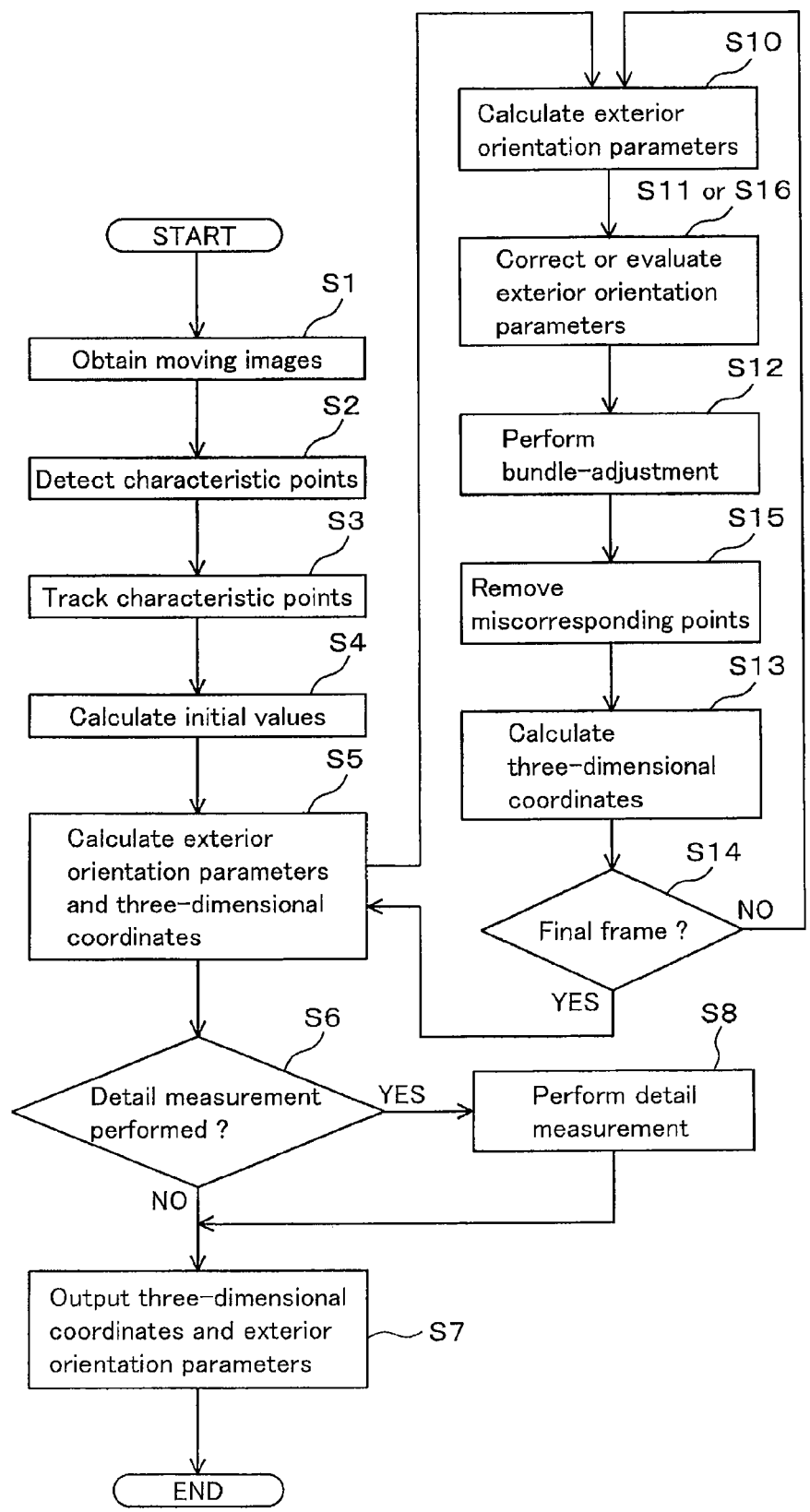
FIG. 19 is a flow chart including a step of removing miscorresponding points.
Figure 20:
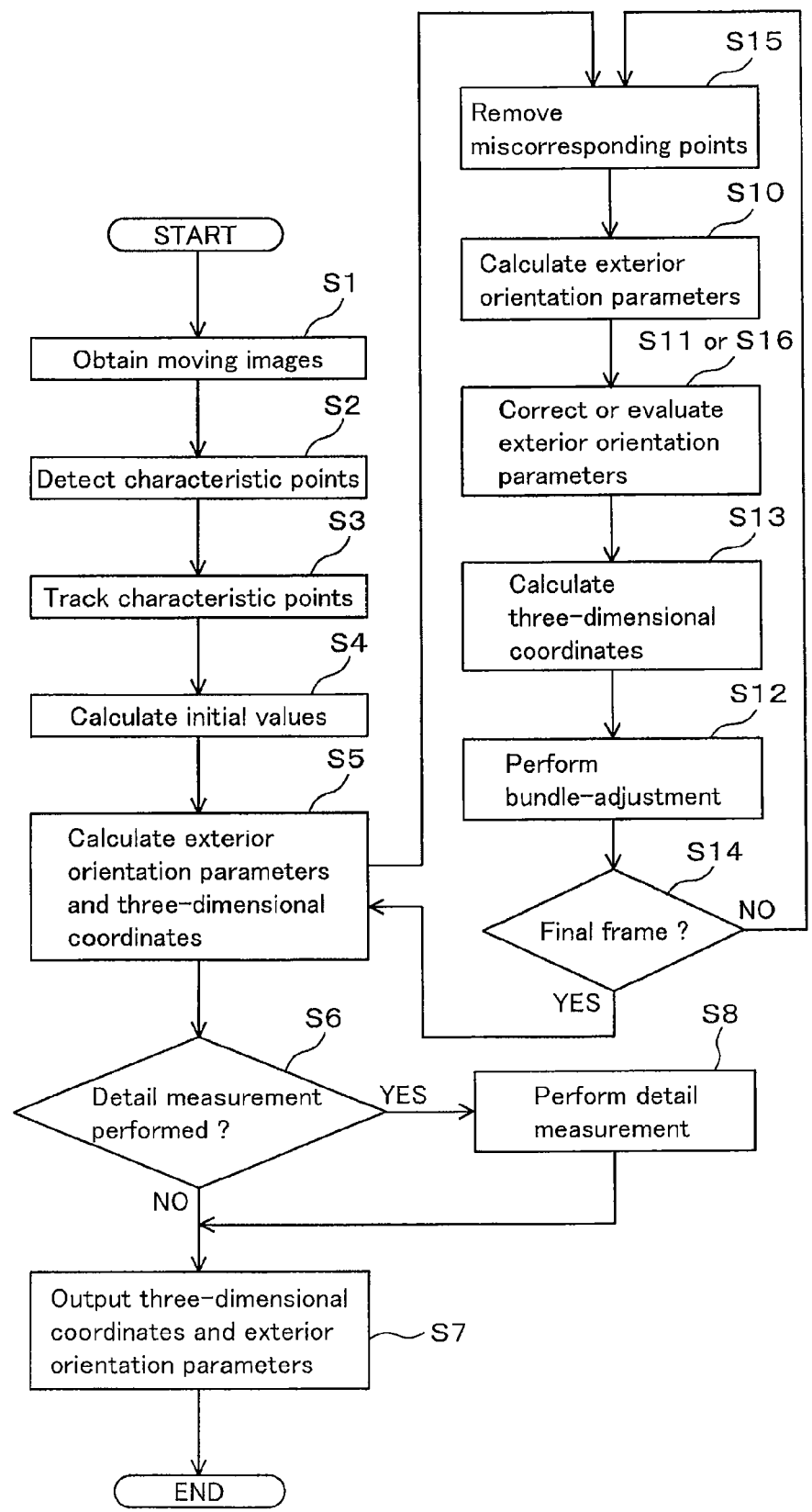
FIG. 20 is a flow chart including a step of removing miscorresponding points.

FIGS. 18 to 20 are flow charts including a step of removing miscorresponding points. The step of removing miscorresponding points is performed after the bundle adjustment (FIGS. 18 and 19) or before the calculation of the exterior orientation parameters (FIG. 20). In the case shown in FIG. 18, the calculation accuracy of the exterior orientation parameters of the subsequent frames is improved. In the case shown in FIG. 19, since the three-dimensional coordinates of the miscorresponding points which are removed are not calculated, the calculation process becomes more efficient. In the case shown in FIG. 20, the calculation accuracy of the exterior orientation parameters of the current frame is improved.

In the method for removing the miscorresponding points, the backward projection or the vertical parallax calculated by the relative orientation is used. These removal methods may be used separately or may be used together depending on the photographing conditions. For example, the removing of the miscorresponding points by the backward projection using a single photo orientation is used when the change of the scene is large because the miscorresponding points are removed based on one image. On the other hand, the removing of the miscorresponding points by the relative orientation is used when the change of the scene is small because the miscorresponding points are removed based on plural images.

In order to estimate a threshold value for evaluating the errors, a robust estimation may be used. For example, a LMedS estimation (Least Median of Squares estimation), a RANSAC estimation (RANdom SAmple Consensus estimation), and an M estimation may be used. Specifically, the LMedS estimation is superior in robustness, and the miscorresponding points are automatically removed even when the error range is unknown.

The threshold value for evaluating the errors may be set to be a fixed threshold value which is adjustable, instead of using the robust estimation. According to this embodiment, the calculation process is simple, whereby the processing speed is improved.

The fourth embodiment of the present invention will be described according to a flow chart shown in FIG. 21 hereinafter. FIG. 21A is a flow chart for removing the miscorresponding points by the backward projection, and FIG. 21B is a flow chart for removing the miscorresponding points by using the vertical parallax.

Removal of the Miscorresponding Points by the Backward Projection

First, corresponding points which are tracked are randomly sampled (step S20). Then, image coordinates (x', y') of a corresponding point with respect to each of the sampled point are calculated based on the exterior orientation parameters calculated by the backward intersection method (single photo orientation or DLT method) and the three-dimensional coordinates of the tracked corresponding point. For example, in a case of the single photo orientation, by substituting the exterior orientation parameters ($X_0$, $Y_0$, $Z_0$, $\omega$, $\phi$, $\kappa$) and the three-dimensional coordinates (X, Y, Z) of the corresponding point for the collinearity conditional formula of the sixth formula, the image coordinates (x', y') are inversely calculated (step S21).

In each of the sampled points, a square of a residual value between the image coordinates (x', y') obtained by the backward intersection method and the image coordinates (x, y) of the tracked corresponding point is calculated, and a central value of the squares of the residual values is calculated (step S22). Then, the steps S20 to S22 are repeated, and the minimum value (LMedS) of the central value is calculated (step S23). A standard of the LMedS is shown in the following thirtieth formula.

$$\text{LMedS} = \min(\text{med}(\epsilon_i^2)) \qquad \text{Thirtieth Formula}$$

i: Data number
$\epsilon$: Error between the image coordinates of the tracked corresponding point and the image coordinates calculated by the backward intersection method
med ( ): Center value
min ( ): Minimum value The number of times required to repeat the steps S20 to S22 is defined by using probability in which an exception value is not included at least one time in q times of the random sampling. For example, if the rate of the exception value in the whole data is represented as "c", the probability P is represented by the following thirty-first formula. For example, when c=0.3 and n=3, q=11 in order to obtain P=0.01.

$$P = 1 - \{1 - (1 - c^n)\}^q \qquad \text{Thirty-first Formula}$$

n: Number of data
c: Rate of outliers in the overall data
q: Times required to repeat
P: Rate in which an exception value is not included at least one time in q times of the random sampling Then, points having large errors are removed by using the value of the LMedS calculated in the step S23 as a threshold value (step S24).

Removal of the Miscorresponding Point by Using the Vertical Parallax

First, corresponding points in the prior and the subsequent images are randomly sampled (step S30). Then, as shown in FIG. 6, the sampled corresponding points ($P_1$, $P_2$) have a point P in the real space, and three-dimensional coordinates of the point P are reprojected on a stereo image shown by the dotted lines according to the coplanar conditional formula (sixth formula) of the relative orientation (step S31).

The vertical parallax is calculated as the difference between the y coordinates of the two corresponding points that are reprojected. The vertical parallax is a difference of y-coordinates of corresponding points in two images that are stereographed, that is, a difference of coordinate values in a direction intersecting a baseline direction of the stereo images at a right angle. The stereo images are a pair of images and are made of two images photographed by cameras in a condition in which the optical axes are parallel, and directions intersecting a baseline direction at a right angle are parallel. Then, a square of the vertical parallax is calculated, and the central value of the squares of the vertical parallaxes is calculated (step S32). The steps S30 to S32 are repeated, and the minimum value (LMdeS) of the central value is obtained (step S33). The standard of the LMedS is represented by the thirtieth formula.

Then, points having large errors are removed by using the value of the LMedS calculated in the step S33 as a threshold value (step S34).

Advantages of the Fourth Embodiment

The tracking results of the characteristic points include numerous miscorresponding points. Therefore, the exterior orientation parameters and the three-dimensional coordinates of the characteristic points calculated based on the miscorresponding points are inferior in the accuracy. However, by removing the miscorresponding points, the calculation accuracy of the exterior orientation parameters and the three-dimensional coordinates of the characteristic points are improved, and the errors are decreased.

Moreover, the method for removing the miscorresponding points (residual value calculated by the backward projection or the vertical parallax calculated by the relative orientation) is selected based on the change of the photographing conditions. Therefore, the exterior orientation parameters and the three-dimensional coordinates of the characteristic points are calculated regardless of the change of the photographing conditions.

In the LMedS method, compared to the least-squares method, even when numerous outliers are included in the data, the outliers are robustly estimated. Accordingly, the errors of the exterior orientation parameters and the three-dimensional coordinates of the characteristic points are decreased.

Industrial Applicability

The present invention can be utilized in a position measurement method, a position measurement device, and programs therefor. In this case, the position measurement method, the position measurement device, and the programs therefor may be used for measuring a position and a posture, at which photograph is performed, and a three-dimensional position of an object, based on moving images.

What is claimed is:

1. A position measurement method comprising:
an initial value calculating step for calculating initial values of exterior orientation parameters, which are a photographing position and a photographing posture in an initial image;
an exterior orientation parameter-calculating step for calculating exterior orientation parameters, based on known points in a moving image which follows the initial image, or characteristic points in which three-dimensional coordinates are already calculated;
an exterior orientation parameter correcting step for correcting the exterior orientation parameters calculated in the exterior orientation parameter-calculating step;
a bundle-adjusting step for simultaneously adjusting a bundle of the exterior orientation parameters of one or more images and the three-dimensional coordinates of the characteristic points, based on the exterior orientation parameters corrected by the exterior orientation parameter correcting step;
a three-dimensional coordinate calculating step for calculating three-dimensional coordinates of characteristic points subsequently detected in an area in which the density of the characteristic points is decreased, based on the exterior orientation parameters adjusted bundle thereof; and
a repeating step for repeating processing from the exterior orientation parameter-calculating step to the three-dimensional coordinate calculating step until the image becomes a final image,
wherein the exterior orientation parameter correcting step corrects the exterior orientation parameters, based on difference between photographing timing of an image and obtaining timing of a photographing position measured by a position measuring unit, wherein the exterior orientation parameters are obtained by the photographing position measured by the position measuring unit at the obtaining timing.

2. The position measurement method according to claim 1, wherein the bundle-adjusting step bundle-adjusts by calculating weight of the photographing position and the photographing posture measured outside and weights of the exterior orientation parameters and the three-dimensional coordinates of the characteristic points, and by weighting each data.

3. The position measurement method according to claim 2, wherein the weight of the photographing position and the photographing posture measured outside is calculated, based on differences between the photographing timing of the image and the obtaining timing of the photographing position and the photographing posture measured outside.

4. The position measurement method according to claim 2, wherein the weights of the exterior orientation parameters and the three-dimensional coordinates of the characteristic points are calculated, based on residual between image coordinates of corresponding points calculated by tracking the characteristic points and image coordinates which project three-dimensional coordinates of the corresponding points on the image.

5. The position measurement method according to claim 2, wherein the bundle-adjusting step is performed before the calculation of the three-dimensional coordinates of the characteristic points subsequently detected or after the calculation of the three-dimensional coordinates of the characteristic points subsequently detected.

6. The position measurement method according to claim 1 further comprising a miscorresponding point removing step for removing miscorresponding points, based on residual between image coordinates of corresponding points calculated by tracking the characteristic points and image coordinates which project three-dimensional coordinates of the corresponding points on the image.

7. The position measurement method according to claim 1 further comprising a miscorresponding point removing step for projecting three-dimensional coordinates of corresponding points in prior and subsequent images on a stereo image and for removing miscorresponding points based on difference of coordinate values in a direction intersecting a baseline of prior and subsequent stereo images at right angle.

8. The position measurement method according to claim 6, wherein the miscorresponding point removing step is performed after the bundle-adjusting step or before the exterior orientation parameter-calculating step.

9. The position measurement method according to claim 6, wherein the miscorresponding point removing step is selected based on change in photographing conditions.

10. The position measurement method according to claim 6, wherein the miscorresponding point removing step estimates threshold value by an LMedS estimation method.

11. A non-transitory recording medium containing a program for running the following steps to a computer, the steps comprising:
an initial value calculating step for calculating initial values of exterior orientation parameters, which are a photographing position and a photographing posture in an initial image;
an exterior orientation parameter-calculating step for calculating exterior orientation parameters, based on known points in a moving image which follows the initial image, or characteristic points in which three-dimensional coordinates are already calculated;
an exterior orientation parameter correcting step for correcting the exterior orientation parameters calculated in the exterior orientation parameter-calculating step;
a bundle-adjusting step for simultaneously adjusting a bundle of the exterior orientation parameters of one or more images and the three-dimensional coordinates of the characteristic points, based on the exterior orientation parameters corrected by the exterior orientation parameter correcting step;
a three-dimensional coordinate calculating step for calculating three-dimensional coordinates of characteristic points subsequently detected in an area in which the density of the characteristic points is decreased, based on the exterior orientation parameters adjusted bundle thereof; and
a repeating step for repeating processing from the exterior orientation parameter-calculating step to the three-dimensional coordinate calculating step until the image becomes a final image,
wherein the exterior orientation parameter correcting step corrects the exterior orientation parameters, based on difference between photographing timing of an image and obtaining timing of a photographing position measured by a position measuring unit, wherein the exterior orientation parameters are obtained by the photographing position measured by the position measuring unit at the obtaining timing.

12. A position measurement device comprising:

a camera that obtains a moving image that is photographed by relatively shifting a photographing section and a photographed object incrementally;

a position measuring unit that measures a photographing position of a camera from an outside;

a posture measuring unit that measures photographing posture of the camera from the outside; and a computer processing unit that inputs the photographing position measured by the position measuring unit, and the photographing posture measured by the posture measuring unit and comprising a central processing unit (CPU) and a memory device storing position measurement programs, wherein the central processing unit (CPU) reads and executes the position measurement programs to perform operations comprising:

(a) calculating initial values of exterior orientation parameters, which are a photographing position and a photographing posture in an initial image;

(b) calculating exterior orientation parameters, based on known points in a moving image which follows the initial image, or characteristic points in which three-dimensional coordinates are already calculated;

(c) correcting the calculated exterior orientation parameters, based on difference between photographing timing of the image and obtaining timing of the photographing position measured by the position measuring unit and the photographing posture measured by the posture measuring unit, wherein the exterior orientation parameters are obtained by the photographing position measured by the position measuring unit at the obtaining timing;

(d) simultaneously adjusting a bundle of the exterior orientation parameters of one or more images and the three-dimensional coordinates of the characteristic points, based on the exterior orientation parameters corrected by the exterior orientation parameter correcting section;

(e) calculating three-dimensional coordinates of characteristic points subsequently detected in an area in which the density of the characteristic points is decreased, based on the exterior orientation parameters adjusted bundle thereof; and repeating the operations (b) to (e) until the image becomes a final image.

13. The position measurement method according to claim 7, wherein the miscorresponding point removing step is performed after the bundle-adjusting step or before the exterior orientation parameter-calculating step.

14. The position measurement method according to claim 7, wherein the miscorresponding point removing step is selected based on change in photographing conditions.

15. The position measurement method according to claim 7, wherein the miscorresponding point removing step estimates threshold value by an LMedS estimation method.

16. A position measurement method comprising:

an initial value calculating step for calculating initial values of exterior orientation parameters, which are a photographing position and a photographing posture in an initial image;

an exterior orientation parameter-calculating step for calculating exterior orientation parameters, based on known points in a moving image which follows the initial image, or characteristic points in which three-dimensional coordinates are already calculated;

an exterior orientation parameter correcting step for correcting the exterior orientation parameters calculated in the exterior orientation parameter-calculating step;

a bundle-adjusting step for simultaneously adjusting a bundle of the exterior orientation parameters of one or more images and the three-dimensional coordinates of the characteristic points, based on the exterior orientation parameters corrected by the exterior orientation parameter correcting step;

a three-dimensional coordinate calculating step for calculating three-dimensional coordinates of characteristic points subsequently detected in an area in which the density of the characteristic points is decreased, based on the exterior orientation parameters adjusted bundle thereof; and a repeating step for repeating processing from the exterior orientation parameter-calculating step to the three-dimensional coordinate calculating step until the image becomes a final image, wherein the exterior orientation parameter correcting step corrects the exterior orientation parameters, based on difference between photographing timing of an image and obtaining timing of a photographing posture measured by a posture measuring unit, wherein the exterior orientation parameters are obtained by the photographing posture measured by the posture measuring unit at the obtaining timing.

* * * * *